United States Patent
Wu et al.

(10) Patent No.: US 10,743,368 B2
(45) Date of Patent: Aug. 11, 2020

(54) NETWORK ROAMING PROTECTION METHOD, RELATED DEVICE, AND SYSTEM

(71) Applicant: HUAWEI TECHNOLOGIES CO., LTD., Shenzhen, Guangdong (CN)

(72) Inventors: Rong Wu, Shenzhen (CN); Bo Zhang, Shenzhen (CN); Lu Gan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/351,772

(22) Filed: Mar. 13, 2019

(65) Prior Publication Data
US 2019/0215904 A1    Jul. 11, 2019

Related U.S. Application Data
(63) Continuation of application No. PCT/CN2017/090286, filed on Jun. 27, 2017.

(30) Foreign Application Priority Data
Sep. 14, 2016  (CN) .......................... 2016 1 0826048

(51) Int. Cl.
*H04W 8/12* (2009.01)
*H04W 80/10* (2009.01)
(Continued)

(52) U.S. Cl.
CPC ............ *H04W 80/10* (2013.01); *H04W 8/12* (2013.01); *H04W 12/02* (2013.01); *H04W 12/04* (2013.01);
(Continued)

(58) Field of Classification Search
CPC ......... H04W 8/10; H04W 8/12; H04W 12/06; H04W 12/04; H04W 12/0401;
(Continued)

(56) References Cited

U.S. PATENT DOCUMENTS

| 7,639,802 B2* | 12/2009 | Gundavelli | ............. H04L 63/06 380/44 |
| 8,098,818 B2* | 1/2012 | Grilli | .................... H04L 12/189 380/270 |

(Continued)

FOREIGN PATENT DOCUMENTS

| CN | 1489398 A | 4/2004 |
| CN | 102137397 A | 7/2011 |

(Continued)

OTHER PUBLICATIONS

3GPP TR 23.799 V0.6.0 (Jul. 2016), 3rd Generation Partnership Project;Technical Specification Group Services and System Aspects; Study on Architecture for Next Generation System (Release 14), Jul. 2016, 321 pages.

(Continued)

*Primary Examiner* — Curtis A Alia
(74) *Attorney, Agent, or Firm* — Fish & Richardson P.C.

(57) ABSTRACT

Embodiments of the present disclosure disclose a network roaming protection method and related device. The method includes: receiving, by a visited session management device, a first session establishment request that includes a first security requirement; obtaining, by the visited session management device, a target security policy, where the target security policy is obtained by processing the first security requirement set and a second security requirement set using a preset rule; and sending the target security policy to the UE instructing the UE to generate a target shared key based on a reference shared key and according to a rule defined by the target security policy, where the target shared key is used to protect secure end-to-end data transmission between the UE and the visited gateway.

20 Claims, 12 Drawing Sheets

(51) Int. Cl.
*H04W 12/06* (2009.01)
*H04W 12/04* (2009.01)
*H04W 12/02* (2009.01)
*H04W 88/16* (2009.01)
*H04W 84/04* (2009.01)

(52) U.S. Cl.
CPC ....... *H04W 12/06* (2013.01); *H04W 12/0609* (2019.01); *H04W 88/16* (2013.01); *H04W 84/042* (2013.01)

(58) Field of Classification Search
CPC . H04W 12/02; H04W 12/0609; H04W 88/16; H04W 84/042
See application file for complete search history.

(56) References Cited

U.S. PATENT DOCUMENTS

| | | | | |
|---|---|---|---|---|
| 8,275,355 | B2* | 9/2012 | Huang | H04L 63/0869 380/247 |
| 8,332,912 | B2* | 12/2012 | Naslund | H04W 12/04 726/3 |
| 9,008,309 | B2 | 4/2015 | Luft et al. | |
| 2002/0114469 | A1* | 8/2002 | Faccin | H04L 9/3271 380/270 |
| 2004/0005057 | A1 | 1/2004 | Jang et al. | |
| 2010/0056182 | A1* | 3/2010 | Venkatachalam | H04L 63/126 455/456.3 |
| 2013/0003972 | A1 | 1/2013 | Kang et al. | |
| 2016/0127327 | A1 | 5/2016 | Mehta et al. | |

FOREIGN PATENT DOCUMENTS

| | | |
|---|---|---|
| CN | 102223231 A | 10/2011 |
| CN | 103634796 A | 3/2014 |
| CN | 103840941 A | 6/2014 |
| EP | 3481000 A1 | 5/2019 |

OTHER PUBLICATIONS

PCT International Search Report and Written Opinion issued in International Application No. PCT/CN2017/090286 dated Aug. 17, 2017, 15 pages (with English translation).

Tao Yan, "Research on the Key Problems of Privacy Protection and Key Management in the Internet of Things," Beijing University of Posts and Telecommunications, dated Jan. 7, 2012, 115 pages (partial English translation.

3GPP TR 33.899 V0.4.1 (Aug. 2016), "3rd Generation Partnership Project; Technical Specification Group Services and System Aspects; Study on the security aspects of the next generation system (Release 14)," Technical Report, Aug. 2016, 156 pages.

Extended European Search Report issued in European Application No. 17850070.8 dated Jul. 25, 2019, 13 pages.

* cited by examiner

NETWORK ROAMING PROTECTION METHOD, RELATED DEVICE, AND SYSTEM

CROSS-REFERENCE TO RELATED APPLICATIONS

This application is a continuation of International Application No. PCT/CN2017/090286, filed on Jun. 27, 2017, which claims priority to a continuation of Chinese Application No. 201610826048.7, filed on Sep. 14, 2016. The disclosures of the aforementioned applications are hereby incorporated by reference in their entireties.

TECHNICAL FIELD

The present invention relates to the field of communications technologies, and in particular, to a network roaming protection method, a related device, and a system.

BACKGROUND

Future 5th-generation (5G) mobile communications technology networks are developing toward diversified, broadband, comprehensive, and intelligent networks. With popularization of various user equipments (UE), mobile data traffic is explosively increased. To improve traffic transmission efficiency, the 5G network is also correspondingly improved in terms of interaction process. For example, in a 5G technology, when transmitting data in a network, UE does not need to verify security of the data between the UE and an access network (AN) device, the AN is used to forward data between the UE and a user plane gateway (UP-GW), and an operation of verifying security of the data is performed by the UE and the UP-GW in the network. To be specific, secure end-to-end data transmission between the UE and the UP-GW is protected.

FIG. 1 is a schematic diagram of a roaming process of a 5G network that is currently being researched. The roaming process is related to roaming between different public land mobile networks (PLMN). A home network (HPLMN) is a PLMN to which user equipment is homed, and a visited network (VPLMN) is a PLMN that the user equipment visits. Network elements required to perform the process include the UE, an AN, a session management device (SM), a UP-GW, a security policy control function (SPCF), and the like. For ease of distinguishment, a session management device SM in the visited network may be referred to as a V-SM, a session management device SM in the home network may be referred to as an H-SM, a user plane gateway UP-GW in the visited network may be referred to as a VUP-GW, and a user plane gateway UP-GW in the home network may be referred to as an HUP-GW. The roaming process is as follows:

Step 1: The UE sends a session establishment request to the session management device V-SM in the visited network.

Step 2: After receiving the session establishment request, the V-SM determines, based on information carried in the UE, the session management device H-SM that is in the home network and that is interconnected to the UE.

Step 3: The V-SM selects the user plane gateway VUP-GW in the visited network.

Step 4: The V-SM interacts with the selected VUP-GW to establish a user plane path.

Step S: The V-SM sends a session establishment request to the H-SM.

Step 6: The H-SM interacts with a security policy control function in the home network to obtain information required to establish a new session, for example, subscription data and service data.

Step 7: The H-SM determines to provide the access user plane gateway HUP-GW to the UE.

Step 8: The H-SM interacts with the HUP-GW to establish a user plane path.

Step 9: The H-SM sends a session establishment response to the V-SM.

Step 10: After receiving the session establishment response, the V-SM applies, to the AN, for a resource required to establish a session.

Step 11: The V-SM interacts, based on the obtained resource required to establish a session, with the VUP-GW to update the user plane path.

Step 12: The V-SM interacts with the UE to complete session establishment.

After performing the foregoing process, the UE establishes a new session (session) in the VPLMN. How to ensure secure transmission of data in the new session is a problem that is being researched by a person skilled in the art.

SUMMARY

Embodiments of the present invention disclose a network roaming protection method, a related device, and a system, to enable UE to still securely transmit data after network roaming.

According to a first aspect, an embodiment of the present invention provides a network roaming protection method. The method includes:

receiving, by a visited session management device, a first session establishment request that includes a first security requirement set and that is sent by user equipment UE, where the first security requirement set includes a security requirement of the UE and a security requirement of a target service, the security requirement defines at least one of an acceptable key algorithm, an acceptable key length, and an acceptable key update period, the target service is a service that is currently performed by the UE, and the visited session management device is a session management device in a visited network of the UE;

obtaining, by the visited session management device, a target security policy, where the target security policy is obtained by processing the first security requirement set and a second security requirement set by using a preset rule, the second security requirement set includes at least one of a security requirement of a visited gateway and a security requirement of a home gateway, the visited gateway is a user plane gateway used when the UE accesses the visited network, and the home gateway is a user plane gateway used when the UE accesses a home network of the UE; and sending, by the visited session management device, the target security policy to the UE, so that the UE generates a target shared key based on a reference shared key and according to a rule defined by the target security policy, where the reference shared key is a base key of the UE in the home network, a shared key derived based on a base key of the UE in the home network, a base key of the UE in the visited network, or a shared key derived based on a base key of the UE in the visited network; the base key of the UE in the home network is a key generated by performing, by the UE, two-way authentication with a key management device in the home network, and the base key of the UE in the visited network is a key generated by performing, by the UE, two-way authentication with a key management device in the visited network; and the target shared key is used to protect secure end-to-end data transmission between the UE and the visited gateway.

By performing the foregoing steps, when the UE roams into the visited network, the target security policy is generated by using a network element in the home network or the visited network, and the target security policy covers security requirements of some network elements in the home network and security requirements of some network elements in the visited network; further, the reference shared key is processed with reference to the rule defined by the target security policy to generate the target shared key, and the reference shared key is a key that is generated by performing, by the UE, two-way authentication in the home network or the visited network or that is further derived; and finally, the UE and the visited gateway in the visited network use the target shared key as a shared key for protecting secure end-to-end data transmission between the UE and the visited gateway, so that the UE can still securely transmit the data after network roaming.

With reference to the first aspect, in a first possible implementation of the first aspect, the second security requirement set includes the security requirement of the visited gateway; and the obtaining, by the visited session management device, a target security policy includes: sending, by the visited session management device, the first security requirement set and the second security requirement set to another device in the visited network, so that the another device in the visited network generates the target security policy based on the first security requirement set and the second security requirement set and sends the target security policy to the visited session management device, or the visited session management device generates the target security policy based on the first security requirement set and the second security requirement set; and the visited session management device pre-stores the security requirement of the visited gateway or the visited session management device obtains the security requirement of the visited gateway from the visited gateway.

With reference to the first aspect, in a second possible implementation of the first aspect, the second security requirement set includes the security requirement of the home gateway; and the obtaining, by the visited session management device, a target security policy includes: sending, by the visited session management device, a second policy request message to a home session management device, where the second policy request message includes the first security requirement set, and the home session management device is a session management device in the home network of the UE; and receiving, by the visited session management device, the target security policy sent by the home session management device, where the target security policy is generated, based on the first security requirement set and the second security requirement set, by a device in the home network triggered by the home session management device after the home session management device receives the second policy request message, and the device in the home network stores the second security requirement set.

With reference to the second possible implementation of the first aspect, in a third possible implementation of the first aspect, when the reference shared key is a base key of the UE in the home network or a shared key derived based on a base key of the UE in the home network, after the receiving, by a visited session management device, a first session establishment request that includes a first security requirement set and that is sent by user equipment UE, the method further includes: sending, by the visited session management device, a second session establishment request to the home session management device, so that the home session management device triggers the key management device in the home network to perform two-way authentication with the UE to generate the base key of the UE in the home network; receiving, by the visited session management device, the target shared key sent by the home session management device, where the target shared key is generated by the home session management device based on the target security policy and the reference shared key, and the reference shared key is sent by the key management device in the home network; and sending, by the visited session management device, the target shared key to the visited gateway.

With reference to the second possible implementation of the first aspect, in a fourth possible implementation of the first aspect, when the reference shared key is a base key of the UE in the visited network or a shared key derived based on a base key of the UE in the visited network, the method further includes: triggering, by the visited session management device, the key management device in the visited network to perform two-way authentication with the UE to generate the base key of the UE in the visited network, where the key management device pre-obtains subscription information, to be used for two-way authentication, of the UE from a network element in the home network; receiving, by the visited session management device, the reference shared key sent by the key management device in the visited network, and sending the reference shared key to the home session management device; and receiving, by the visited session management device, the target shared key sent by the home session management device, and sending the target shared key to the visited gateway, where the target shared key is generated by the home session management device based on the target security policy and the reference shared key.

With reference to the first possible implementation of the first aspect or the second possible implementation of the first aspect, in a fifth possible implementation of the first aspect, when the reference shared key is a base key of the UE in the home network or a shared key derived based on a base key of the UE in the home network, after the receiving, by a visited session management device, a first session establishment request that includes a first security requirement set and that is sent by user equipment UE, the method further includes: sending, by the visited session management device, a second session establishment request to the home session management device, so that the home session management device triggers the key management device in the home network to perform two-way authentication with the UE to generate the base key of the UE in the home network; receiving, by the visited session management device, the reference shared key that is sent by the key management device in the home network and that is forwarded by the home session management device; and generating, by the visited session management device, the target shared key based on the target security policy and the reference shared key, and sending the target shared key to the visited gateway.

With reference to the first possible implementation of the first aspect or the second possible implementation of the first aspect, in a sixth possible implementation of the first aspect, when the reference shared key is a base key of the UE in the visited network or a shared key derived based on a base key of the UE in the visited network, the method further includes: triggering, by the visited session management device, the key management device in the visited network to perform two-way authentication with the UE to generate the base key of the UE in the visited network, where the key management device pre-obtains subscription information, to be used for two-way authentication, of the UE from a network element in the home network; receiving, by the visited session management device, the reference shared key sent by the key management device in the visited network; and generating, by the visited session management device, the target shared key based on the target security policy and the reference shared key, and sending the target shared key to the visited gateway.

With reference to the first possible implementation of the first aspect, in a seventh possible implementation of the first aspect, when the reference shared key is a base key of the UE in the home network or a shared key derived based on a base key of the UE in the home network, after the receiving, by a visited session management device, a first session establishment request that includes a first security requirement set and that is sent by user equipment UE, the method further includes: sending, by the visited session management device, a second session establishment request to the home session management device, so that the home session management device triggers the key management device in the home network to perform two-way authentication with the UE to generate the base key of the UE in the home network; and the second session establishment request includes the target security policy; receiving, by the visited session management device, the target shared key sent by the home session management device, where the target shared key is generated by the home session management device based on the target security policy and the reference shared key, and the reference shared key is sent by the key management device in the home network; and sending, by the visited session management device, the target shared key to the visited gateway.

With reference to the first possible implementation of the first aspect, in an eighth possible implementation of the first aspect, when the reference shared key is a base key of the UE in the visited network or a shared key derived based on a base key of the UE in the visited network, the method further includes: triggering, by the visited session management device, the key management device in the visited network to perform two-way authentication with the UE to generate the base key of the UE in the visited network, where the key management device pre-obtains subscription information, to be used for two-way authentication, of the UE from a network element in the home network; receiving, by the visited session management device, the reference shared key sent by the key management device in the visited network, and sending the reference shared key and the target security policy to the home session management device; and receiving, by the visited session management device, the target shared key sent by the home session management device, and sending the target shared key to the visited gateway, where the target shared key is generated by the home session management device based on the target security policy and the reference shared key.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, or the eighth possible implementation of the first aspect, in a ninth possible implementation of the first aspect, the target security policy is obtained by processing the first security requirement set, a second security requirement, and a third security requirement set by using the preset rule, and the third security requirement set includes at least one of a security requirement of a server for providing the target service and a security requirement of a subscription server of the UE.

According to a second aspect, an embodiment of the present invention provides a network roaming protection method. The method includes:

sending, by user equipment UE, a first session establishment request including a first security requirement set to a visited session management device, where the first security requirement set includes a security requirement of the UE and a security requirement of a target service, the security requirement defines at least one of an acceptable key algorithm, an acceptable key length, and an acceptable key update period, the target service is a service that is currently performed by the UE, and the visited session management device is a session management device in a visited network of the UE;

receiving, by the UE, a target security policy sent by the visited session management device, where the target security policy is obtained by processing the first security requirement set and a second security requirement set by using a preset rule, the second security requirement set includes at least one of a security requirement of a visited gateway and a security requirement of a home gateway, the visited gateway is a user plane gateway used when the UE accesses the visited network, and the home gateway is a user plane gateway used when the UE accesses a home network of the UE;

generating, by the UE, a target shared key based on a reference shared key and according to a rule defined by the target security policy, where the reference shared key is a base key of the UE in the home network, a shared key derived based on a base key of the UE in the home network, a base key of the UE in the visited network, or a shared key derived based on a base key of the UE in the visited network; and the base key of the UE in the home network is a key generated by performing, by the UE, two-way authentication with a key management device in the home network, and the base key of the UE in the visited network is a key generated by performing, by the UE, two-way authentication with a key management device in the visited network; and protecting, by the UE, secure data transmission between the UE and the visited gateway by using the target shared key.

By performing the foregoing steps, when the UE roams into the visited network, the target security policy is generated by using a network element in the home network or the visited network, and the target security policy covers security requirements of some network elements in the home network and security requirements of some network elements in the visited network; further, the reference shared key is processed with reference to the rule defined by the target security policy to generate the target shared key, and the reference shared key is a key that is generated by performing, by the UE, two-way authentication in the home network or the visited network or that is further derived; and finally, the UE and the visited gateway in the visited network use the target shared key as a shared key for protecting secure end-to-end data transmission between the UE and the visited gateway, so that the UE can still securely transmit the data after network roaming.

With reference to the second aspect, in a first possible implementation of the second aspect, the reference shared key is a base key of the UE in the home network or a shared key derived based on a base key of the UE in the home network; and before the generating, by the UE, a target shared key based on a reference shared key and according to a rule defined by the target security policy, the method further includes: performing, by the UE, two-way authentication with the key management device in the home network to generate the base key of the UE in the home network.

With reference to the second aspect, in the second possible implementation of the second aspect, the reference shared key is a base key of the UE in the visited network or a shared key derived based on a base key of the UE in the visited network; and before the generating, by the UE, a target shared key based on a reference shared key and according to a rule defined by the target security policy, the method further includes: performing, by the UE, two-way authentication with the key management device in the visited network to generate the base key of the UE in the visited network, where the key management device pre-obtains subscription information, to be used for two-way authentication, of the UE from a network element in the home network.

According to a third aspect, an embodiment of the present invention provides a visited session management device. The visited session management device includes:

a first receiving unit, configured to receive a first session establishment request that includes a first security requirement set and that is sent by user equipment UE, where the first security requirement set includes a security requirement of the UE and a security requirement of a target service, the security requirement defines at least one of an acceptable key algorithm, an acceptable key length, and an acceptable key update period, the target service is a service that is currently performed by the UE, and the visited session management device is a session management device in a visited network of the UE;

an obtaining unit, configured to obtain a target security policy, where the target security policy is obtained by processing the first security requirement set and a second security requirement set by using a preset rule, the second security requirement set includes at least one of a security requirement of a visited gateway and a security requirement of a home gateway, the visited gateway is a user plane gateway used when the UE accesses the visited network, and the home gateway is a user plane gateway used when the UE accesses a home network of the UE; and a first sending unit, configured to send the target security policy to the UE, so that the UE generates a target shared key based on a reference shared key and according to a rule defined by the target security policy, where the reference shared key is a base key of the UE in the home network, a shared key derived based on a base key of the UE in the home network, a base key of the UE in the visited network, or a shared key derived based on a base key of the UE in the visited network; the base key of the UE in the home network is a key generated by performing, by the UE, two-way authentication with a key management device in the home network, and the base key of the UE in the visited network is a key generated by performing, by the UE, two-way authentication with a key management device in the visited network; and the target shared key is used to protect secure end-to-end data transmission between the UE and the visited gateway.

By running the foregoing units, when the UE roams into the visited network, the target security policy is generated by using a network element in the home network or the visited network, and the target security policy covers security requirements of some network elements in the home network and security requirements of some network elements in the visited network; further, the reference shared key is processed with reference to the rule defined by the target security policy to generate the target shared key, and the reference shared key is a key that is generated by performing, by the UE, two-way authentication in the home network or the visited network or that is further derived; and finally, the UE and the visited gateway in the visited network use the target shared key as a shared key for protecting secure end-to-end data transmission between the UE and the visited gateway, so that the UE can still securely transmit the data after network roaming.

With reference to the third aspect, in a first possible implementation of the third aspect, the second security requirement set includes the security requirement of the visited gateway; and the obtaining unit is specifically configured to send the first security requirement set and the second security requirement set to another device in the visited network, so that the another device in the visited network generates the target security policy based on the first security requirement set and the second security requirement set and sends the target security policy to the visited session management device, or the visited session management device generates the target security policy based on the first security requirement set and the second security requirement set; and the visited session management device pre-stores the security requirement of the visited gateway or the visited session management device obtains the security requirement of the visited gateway from the visited gateway.

With reference to the third aspect, in a second possible implementation of the third aspect, the second security requirement set includes the security requirement of the home gateway; and the obtaining unit is specifically configured to: send a second policy request message to a home session management device, where the second policy request message includes the first security requirement set, and the home session management device is a session management device in the home network of the UE; and receive the target security policy sent by the home session management device, where the target security policy is generated, based on the first security requirement set and the second security requirement set, by a device in the home network triggered by the home session management device after the home session management device receives the second policy request message, and the device in the home network stores the second security requirement set.

With reference to the second possible implementation of the third aspect, in a third possible implementation of the third aspect, when the reference shared key is a base key of the UE in the home network or a shared key derived based on a base key of the UE in the home network, the visited session management device further includes: a second sending unit, configured to: after the first receiving unit receives the first session establishment request that includes the first security requirement set and that is sent by the user equipment UE, send a second session establishment request to the home session management device, so that the home session management device triggers the key management device in the home network to perform two-way authentication with the UE to generate the base key of the UE in the home network; a second receiving unit, configured to receive the target shared key sent by the home session management device, where the target shared key is generated by the home session management device based on the target security policy and the reference shared key, and the reference shared key is sent by the key management device in the home network; and a third sending unit, configured to send the target shared key to the visited gateway.

With reference to the second possible implementation of the third aspect, in a fourth possible implementation of the third aspect, when the reference shared key is a base key of the UE in the visited network or a shared key derived based on a base key of the UE in the visited network, the visited session management device further includes: a first triggering unit, configured to trigger the key management device in the visited network to perform two-way authentication with the UE to generate the base key of the UE in the visited network, where the key management device pre-obtains subscription information, to be used for two-way authentication, of the UE from a network element in the home network; a third receiving unit, configured to receive the reference shared key sent by the key management device in the visited network, and send the reference shared key to the home session management device; and a fourth receiving unit, configured to receive the target shared key sent by the home session management device, and send the target shared key to the visited gateway, where the target shared key is generated by the home session management device based on the target security policy and the reference shared key.

With reference to the first possible implementation of the third aspect or the second possible implementation of the third aspect, in a fifth possible implementation of the third aspect, when the reference shared key is a base key of the UE in the home network or a shared key derived based on a base key of the UE in the home network, the visited session management device further includes: a fourth sending unit, configured to: after the first receiving unit receives the first session establishment request that includes the first security requirement set and that is sent by the user equipment UE, send a second session establishment request to the home session management device, so that the home session management device triggers the key management device in the home network to perform two-way authentication with the UE to generate the base key of the UE in the home network; a fifth receiving unit, configured to receive the reference shared key that is sent by the key management device in the home network and that is forwarded by the home session management device; and a first generation unit, configured to generate the target shared key based on the target security policy and the reference shared key, and send the target shared key to the visited gateway.

With reference to the first possible implementation of the third aspect or the second possible implementation of the third aspect, in a sixth possible implementation of the third aspect, when the reference shared key is a base key of the UE in the visited network or a shared key derived based on a base key of the UE in the visited network, the visited session management device further includes: a second triggering unit, configured to trigger the key management device in the visited network to perform two-way authentication with the UE to generate the base key of the UE in the visited network, where the key management device pre-obtains subscription information, to be used for two-way authentication, of the UE from a network element in the home network; a sixth receiving unit, configured to receive the reference shared key sent by the key management device in the visited network; and a second generation unit, configured to generate the target shared key based on the target security policy and the reference shared key, and send the target shared key to the visited gateway.

With reference to the first possible implementation of the third aspect, in a seventh possible implementation of the third aspect, when the reference shared key is a base key of the UE in the home network or a shared key derived based on a base key of the UE in the home network, the visited session management device further includes: a fifth sending unit, configured to: after the first receiving unit receives the first session establishment request that includes the first security requirement set and that is sent by the user equipment UE, send a second session establishment request to the home session management device, so that the home session management device triggers the key management device in the home network to perform two-way authentication with the UE to generate the base key of the UE in the home network; and the second session establishment request includes the target security policy; a seventh receiving unit, configured to receive the target shared key sent by the home session management device, where the target shared key is generated by the home session management device based on the target security policy and the reference shared key, and the reference shared key is sent by the key management device in the home network; and a sixth sending unit, configured to send the target shared key to the visited gateway.

With reference to the first possible implementation of the third aspect, in an eighth possible implementation of the third aspect, when the reference shared key is a base key of the UE in the visited network or a shared key derived based on a base key of the UE in the visited network, the visited session management device further includes: a third triggering unit, configured to trigger the key management device in the visited network to perform two-way authentication with the UE to generate the base key of the UE in the visited network, where the key management device pre-obtains subscription information, to be used for two-way authentication, of the UE from a network element in the home network; an eighth receiving unit, configured to receive the reference shared key sent by the key management device in the visited network, and send the reference shared key and the target security policy to the home session management device; and a ninth receiving unit, configured to receive the target shared key sent by the home session management device, and send the target shared key to the visited gateway, where the target shared key is generated by the home session management device based on the target security policy and the reference shared key.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, the seventh possible implementation of the third aspect, or the eighth possible implementation of the third aspect, in a ninth possible implementation of the third aspect, the target security policy is obtained by processing the first security requirement set, a second security requirement, and a third security requirement set by using the preset rule, and the third security requirement set includes at least one of a security requirement of a server for providing the target service and a security requirement of a subscription server of the UE.

According to a fourth aspect, an embodiment of the present invention provides user equipment. The user equipment includes:

a sending unit, configured, by the UE, to send a first session establishment request including a first security requirement set to a visited session management device, where the first security requirement set includes a security requirement of the UE and a security requirement of a target service, the security requirement defines at least one of an acceptable key algorithm, an acceptable key length, and an acceptable key update period, the target service is a service that is currently performed by the UE, and the visited session management device is a session management device in a visited network of the UE;

a receiving unit, configured to receive a target security policy sent by the visited session management device, where the target security policy is obtained by processing the first security requirement set and a second security requirement set by using a preset rule, the second security requirement set includes at least one of a security requirement of a visited gateway and a security requirement of a home gateway, the visited gateway is a user plane gateway used when the UE accesses the visited network, and the home gateway is a user plane gateway used when the UE accesses a home network of the UE;

a generation unit, configured to generate a target shared key based on a reference shared key and according to a rule defined by the target security policy, where the reference shared key is a base key of the UE in the home network, a shared key derived based on a base key of the UE in the home network, a base key of the UE in the visited network, or a shared key derived based on a base key of the UE in the visited network; and the base key of the UE in the home network is a key generated by performing, by the UE, two-way authentication with a key management device in the home network, and the base key of the UE in the visited network is a key generated by performing, by the UE, two-way authentication with a key management device in the visited network; and a transmission unit, configured to protect secure data transmission between the UE and the visited gateway by using the target shared key.

By running the foregoing units, when the UE roams into the visited network, the target security policy is generated by using a network element in the home network or the visited network, and the target security policy covers security requirements of some network elements in the home network and security requirements of some network elements in the visited network; further, the reference shared key is processed with reference to the rule defined by the target security policy to generate the target shared key, and the reference shared key is a key that is generated by performing, by the UE, two-way authentication in the home network or the visited network or that is further derived; and finally, the UE and the visited gateway in the visited network use the target shared key as a shared key for protecting secure end-to-end data transmission between the UE and the visited gateway, so that the UE can still securely transmit the data after network roaming.

With reference to the fourth aspect, in a first possible implementation of the fourth aspect, the reference shared key is a base key of the UE in the home network or a shared key derived based on a base key of the UE in the home network, and the user equipment further includes: a first authentication unit, configured to: before the generation unit generates the target shared key based on the reference shared key and based on the rule defined by the target security policy, perform two-way authentication with the key management device in the home network to generate the base key of the UE in the home network.

With reference to the fourth aspect, in a second possible implementation of the fourth aspect, the reference shared key is a base key of the UE in the visited network or a shared key derived based on a base key of the UE in the visited network; and the user equipment further includes: a second authentication unit, configured to: before the generation unit generates the target shared key based on the reference shared key and based on the rule defined by the target security policy, perform two-way authentication with the key management device in the visited network to generate the base key of the UE in the visited network, where the key management device pre-obtains subscription information, to be used for two-way authentication, of the UE from a network element in the home network.

According to a fifth aspect, a visited session management device is provided. The visited session management device includes a processor, a memory, and a transceiver, where the memory is configured to store data and a program; and the processor invokes the program in the memory and is configured to perform the following operations:

receiving, by using the transceiver, a first session establishment request that includes a first security requirement set and that is sent by user equipment UE, where the first security requirement set includes a security requirement of the UE and a security requirement of a target service, the security requirement defines at least one of an acceptable key algorithm, an acceptable key length, and an acceptable key update period, the target service is a service that is currently performed by the UE, and the visited session management device is a session management device in a visited network of the UE;

obtaining a target security policy, where the target security policy is obtained by processing the first security requirement set and a second security requirement set by using a preset rule, the second security requirement set includes at least one of a security requirement of a visited gateway and a security requirement of a home gateway, the visited gateway is a user plane gateway used when the UE accesses the visited network, and the home gateway is a user plane gateway used when the UE accesses a home network of the UE; and sending, by using the transceiver, the target security policy to the UE, so that the UE generates a target shared key based on a reference shared key and according to a rule defined by the target security policy, where the reference shared key is a base key of the UE in the home network, a shared key derived based on a base key of the UE in the home network, a base key of the UE in the visited network, or a shared key derived based on a base key of the UE in the visited network; the base key of the UE in the home network is a key generated by performing, by the UE, two-way authentication with a key management device in the home network, and the base key of the UE in the visited network is a key generated by performing, by the UE, two-way authentication with a key management device in the visited network; and the target shared key is used to protect secure end-to-end data transmission between the UE and the visited gateway.

By performing the foregoing operations, when the UE roams into the visited network, the target security policy is generated by using a network element in the home network or the visited network, and the target security policy covers security requirements of some network elements in the home network and security requirements of some network elements in the visited network; further, the reference shared key is processed with reference to the rule defined by the target security policy to generate the target shared key, and the reference shared key is a key that is generated by performing, by the UE, two-way authentication in the home network or the visited network or that is further derived; and finally, the UE and the visited gateway in the visited network use the target shared key as a shared key for protecting secure end-to-end data transmission between the UE and the visited gateway, so that the UE can still securely transmit the data after network roaming.

With reference to the first aspect, in a first possible implementation of the first aspect, the second security requirement set includes the security requirement of the visited gateway; and the obtaining, by the processor, the target security policy is specifically:

sending the first security requirement set and the second security requirement set to another device in the visited network, so that the another device in the visited network generates the target security policy based on the first security requirement set and the second security requirement set and sends the target security policy to the visited session management device, or the visited session management device generates the target security policy based on the first security requirement set and the second security requirement set; and the visited session management device pre-stores the security requirement of the visited gateway or the visited session management device obtains the security requirement of the visited gateway from the visited gateway.

With reference to the first aspect, in a second possible implementation of the first aspect, the second security requirement set includes the security requirement of the home gateway; and the obtaining, by the processor, the target security policy is specifically:

sending, by using the transceiver, a second policy request message to a home session management device, where the second policy request message includes the first security requirement set, and the home session management device is a session management device in the home network of the UE; and receiving, by using the transceiver, the target security policy sent by the home session management device, where the target security policy is generated, based on the first security requirement set and the second security requirement set, by a device in the home network triggered by the home session management device after the home session management device receives the second policy request message, and the device in the home network stores the second security requirement set.

With reference to the second possible implementation of the first aspect, in a third possible implementation of the first aspect, when the reference shared key is a base key of the UE in the home network or a shared key derived based on a base key of the UE in the home network, after the processor receives, by using the transceiver, the first session establishment request that includes the first security requirement set and that is sent by the user equipment UE, the processor is further configured to: send, by using the transceiver, a second session establishment request to the home session management device, so that the home session management device triggers the key management device in the home network to perform two-way authentication with the UE to generate the base key of the UE in the home network; receive, by using the transceiver, the target shared key sent by the home session management device, where the target shared key is generated by the home session management device based on the target security policy and the reference shared key, and the reference shared key is sent by the key management device in the home network; and send, by using the transceiver, the target shared key to the visited gateway.

With reference to the second possible implementation of the first aspect, in a fourth possible implementation of the first aspect, when the reference shared key is a base key of the UE in the visited network or a shared key derived based on a base key of the UE in the visited network, the processor is further configured to:

trigger the key management device in the visited network to perform two-way authentication with the UE to generate the base key of the UE in the visited network, where the key management device pre-obtains subscription information, to be used for two-way authentication, of the UE from a network element in the home network; receive, by using the transceiver, the reference shared key sent by the key management device in the visited network, and send the reference shared key to the home session management device; and receive, by using the transceiver, the target shared key sent by the home session management device, and send the target shared key to the visited gateway, where the target shared key is generated by the home session management device based on the target security policy and the reference shared key.

With reference to the first possible implementation of the first aspect or the second possible implementation of the first aspect, in a fifth possible implementation of the first aspect, when the reference shared key is a base key of the UE in the home network or a shared key derived based on a base key of the UE in the home network, after the processor receives, by using the transceiver, the first session establishment request that includes the first security requirement set and that is sent by the user equipment UE, the processor is further configured to: send, by using the transceiver, a second session establishment request to the home session management device, so that the home session management device triggers the key management device in the home network to perform two-way authentication with the UE to generate the base key of the UE in the home network; receive, by using the transceiver, the reference shared key that is sent by the key management device in the home network and that is forwarded by the home session management device; and generate the target shared key based on the target security policy and the reference shared key, and send the target shared key to the visited gateway.

With reference to the first possible implementation of the first aspect or the second possible implementation of the first aspect, in a sixth possible implementation of the first aspect, when the reference shared key is a base key of the UE in the visited network or a shared key derived based on a base key of the UE in the visited network, the processor is further configured to: trigger the key management device in the visited network to perform two-way authentication with the UE to generate the base key of the UE in the visited network, where the key management device pre-obtains subscription information, to be used for two-way authentication, of the UE from a network element in the home network; receive, by using the transceiver, the reference shared key sent by the key management device in the visited network; and generate the target shared key based on the target security policy and the reference shared key, and send the target shared key to the visited gateway.

With reference to the first possible implementation of the first aspect, in a seventh possible implementation of the first aspect, when the reference shared key is a base key of the UE in the home network or a shared key derived based on a base key of the UE in the home network, after the processor receives, by using the transceiver, the first session establishment request that includes the first security requirement set and that is sent by the user equipment UE, the processor is further configured to: send, by using the transceiver, a second session establishment request to the home session management device, so that the home session management device triggers the key management device in the home network to perform two-way authentication with the UE to generate the base key of the UE in the home network; and the second session establishment request includes the target security policy; receive, by using the transceiver, the target shared key sent by the home session management device, where the target shared key is generated by the home session management device based on the target security policy and the reference shared key, and the reference shared key is sent by the key management device in the home network; and send, by using the transceiver, the target shared key to the visited gateway.

With reference to the first possible implementation of the first aspect, in an eighth possible implementation of the first aspect, when the reference shared key is a base key of the UE in the visited network or a shared key derived based on a base key of the UE in the visited network, the processor is further configured to: trigger the key management device in the visited network to perform two-way authentication with the UE to generate the base key of the UE in the visited network, where the key management device pre-obtains subscription information, to be used for two-way authentication, of the UE from a network element in the home network; receive, by using the transceiver, the reference shared key sent by the key management device in the visited network, and send the reference shared key and the target security policy to the home session management device; and receive, by using the transceiver, the target shared key sent by the home session management device, and send the target shared key to the visited gateway, where the target shared key is generated by the home session management device based on the target security policy and the reference shared key.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, or the eighth possible implementation of the first aspect, in a ninth possible implementation of the first aspect, the target security policy is obtained by processing the first security requirement set, a second security requirement, and a third security requirement set by using the preset rule, and the third security requirement set includes at least one of a security requirement of a server for providing the target service and a security requirement of a subscription server of the UE.

According to a sixth aspect, an embodiment of the present invention provides user equipment. The user equipment includes a processor, a memory, and a transceiver, where the memory is configured to store data and a program; and the processor invokes the program in the memory and is configured to perform the following operations:

sending, by using the transceiver, a first session establishment request including a first security requirement set to a visited session management device, where the first security requirement set includes a security requirement of the UE and a security requirement of a target service, the security requirement defines at least one of an acceptable key algorithm, an acceptable key length, and an acceptable key update period, the target service is a service that is currently performed by the UE, and the visited session management device is a session management device in a visited network of the UE;

receiving, by using the transceiver, a target security policy sent by the visited session management device, where the target security policy is obtained by processing the first security requirement set and a second security requirement set by using a preset rule, the second security requirement set includes at least one of a security requirement of a visited gateway and a security requirement of a home gateway, the visited gateway is a user plane gateway used when the UE accesses the visited network, and the home gateway is a user plane gateway used when the UE accesses a home network of the UE;

generating a target shared key based on a reference shared key and according to a rule defined by the target security policy, where the reference shared key is a base key of the UE in the home network, a shared key derived based on a base key of the UE in the home network, a base key of the UE in the visited network, or a shared key derived based on a base key of the UE in the visited network; and the base key of the UE in the home network is a key generated by performing, by the UE, two-way authentication with a key management device in the home network, and the base key of the UE in the visited network is a key generated by performing, by the UE, two-way authentication with a key management device in the visited network; and protecting secure data transmission between the UE and the visited gateway by using the target shared key.

By performing the foregoing operations, when the UE roams into the visited network, the target security policy is generated by using a network element in the home network or the visited network, and the target security policy covers security requirements of some network elements in the home network and security requirements of some network elements in the visited network; further, the reference shared key is processed with reference to the rule defined by the target security policy to generate the target shared key, and the reference shared key is a key that is generated by performing, by the UE, two-way authentication in the home network or the visited network or that is further derived; and finally, the UE and the visited gateway in the visited network use the target shared key as a shared key for protecting secure end-to-end data transmission between the UE and the visited gateway, so that the UE can still securely transmit the data after network roaming.

With reference to the sixth aspect, in a first possible implementation of the sixth aspect, the reference shared key is a base key of the UE in the home network or a shared key derived based on a base key of the UE in the home network; and before the processor generates the target shared key based on the reference shared key and based on the rule defined by the target security policy, the processor is further configured to: perform two-way authentication with the key management device in the home network to generate the base key of the UE in the home network.

With reference to the sixth aspect, in a second possible implementation of the sixth aspect, the reference shared key is a base key of the UE in the visited network or a shared key derived based on a base key of the UE in the visited network; and before the processor generates the target shared key based on the reference shared key and based on the rule defined by the target security policy, the processor is further configured to: perform two-way authentication with the key management device in the visited network to generate the base key of the UE in the visited network, where the key management device pre-obtains subscription information, to be used for two-way authentication, of the UE from a network element in the home network.

According to a seventh aspect, an embodiment of the present invention provides a network roaming protection system. The system includes a visited session management device and user equipment, and the visited session management device is the visited session management device according to any implementation of the third aspect or any implementation of the fifth aspect; and the user equipment is the user equipment according to any implementation of the third aspect or any implementation of the fifth aspect.

By implementing the embodiments of the present invention, when the UE roams into the visited network, the target security policy is generated by using a network element in the home network or the visited network, and the target security policy covers security requirements of some network elements in the home network and security requirements of some network elements in the visited network; further, the reference shared key is processed with reference to the rule defined by the target security policy to generate the target shared key, and the reference shared key is a key that is generated by performing, by the UE, two-way authentication in the home network or the visited network or that is further derived; and finally, the UE and the visited gateway in the visited network use the target shared key as a shared key for protecting secure end-to-end data transmission between the UE and the visited gateway, so that the UE can still securely transmit the data after network roaming.

BRIEF DESCRIPTION OF DRAWINGS

The following briefly describes the accompanying drawings required for the background or embodiments.

DESCRIPTION OF EMBODIMENTS

Figure 1:
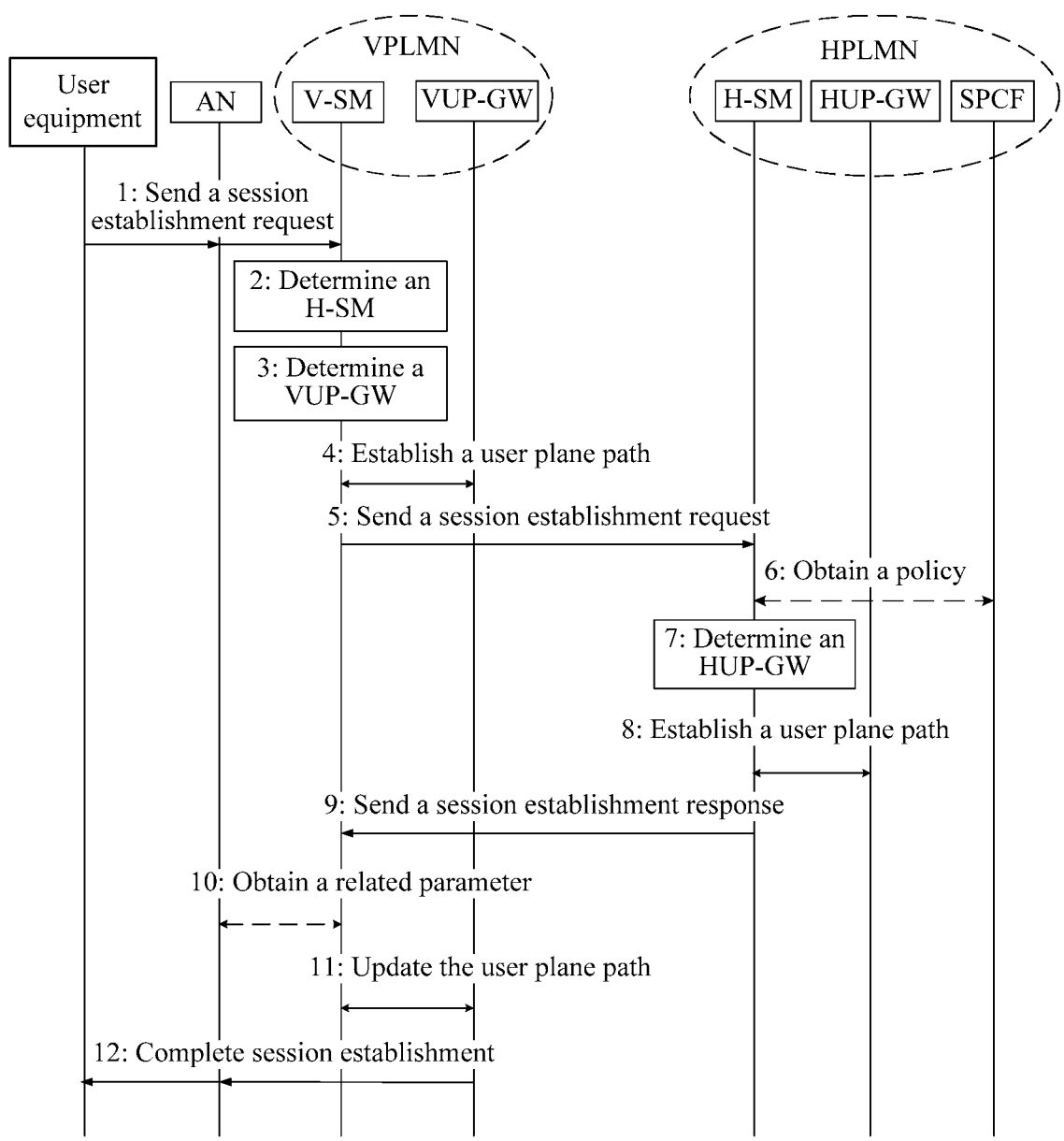
FIG. 1 is a schematic diagram of a network roaming process in the prior art.

The following describes the technical solutions in the embodiments of the present invention with reference to the accompanying drawings in the embodiments of the present invention. Related terms and network elements that may be used in the embodiments of the present invention are first described.

The embodiments of the present invention relate to roaming of user equipment between different public land mobile networks (PLMN for), where a home network (HPLMN) is a PLMN to which the user equipment is homed, and a visited network (VPLMN) is a PLMN that the user equipment visits. A network element in the HPLMN stores subscription information of the user equipment.

User equipment (UE): The UE may be an intelligent terminal such as a mobile phone or a smartwatch, may be a communications device such as a server, a gateway, a base station, or a controller, may be an Internet of Things (IoT) device such as a sensor, a power meter, or a water meter, or may be another device that can access a cellular network.

Mobility management (MM) network element: A physical entity for performing a function of the mobility management network element may be directly referred to as a mobility management device or MM subsequently.

Session management network element (SM): The session management network element is configured to establish and manage a session, a slice, a flow, or a bearer, and a physical entity for performing a function of the session management network element may be referred to as a session management device or SM subsequently. For convenience of distinguishing, a session management device in the HPLMN may be further referred to as a home session management device or H-SM, and a session management device in the VPLMN may be further referred to as a visited session management device or V-SM.

A key management system (KMS) is responsible for generating, managing, and negotiating a key, and supports lawful interception. The KMS may be individually deployed as an independent logical function entity, or may be integrated in a device such as the MM or the SM. A physical entity for performing a function of the key management system may be referred to as a key management device subsequently. Usually, the KMS is an authentication unit (CP-AU) in a network, and a physical entity for performing a function of the authentication unit may be referred to as a key management device or CP-AU subsequently. For convenience of distinguishing, a key management device in the HPLMN may be further referred to as a home key management device or HCP-AU, and a key management device in the VPLMN may be further referred to as a visited key management device or VCP-AU.

Security policy control function (SPCF): The security policy control function is configured to manage a security policy in a network. The HPLMN may have a security policy control function but the VPLMN may have no security policy control function, or the HPLMN and the VPLMN may have respective security policy control functions. For convenience of distinguishing, a security policy control function in the HPLMN may be referred to as an H-SPCF, and a security policy control function in the VPLMN may be referred to as a V-SPCF. When the VPLMN has no security policy control function, the V-SM or another network element in the VPLMN may perform a function related to a security policy.

User plane gateway (UP-GW): The user plane gateway is configured to connect an operator network and a data network (DN), and the UE accesses a network by using the user plane gateway. In the embodiments of the present invention, a gateway used when the UE accesses the HPLMN may be referred to as a home gateway HUP-GW, and a gateway used when the UE accesses the VPLMN may be referred to as a visited gateway VUP-GW.

Figure 2:
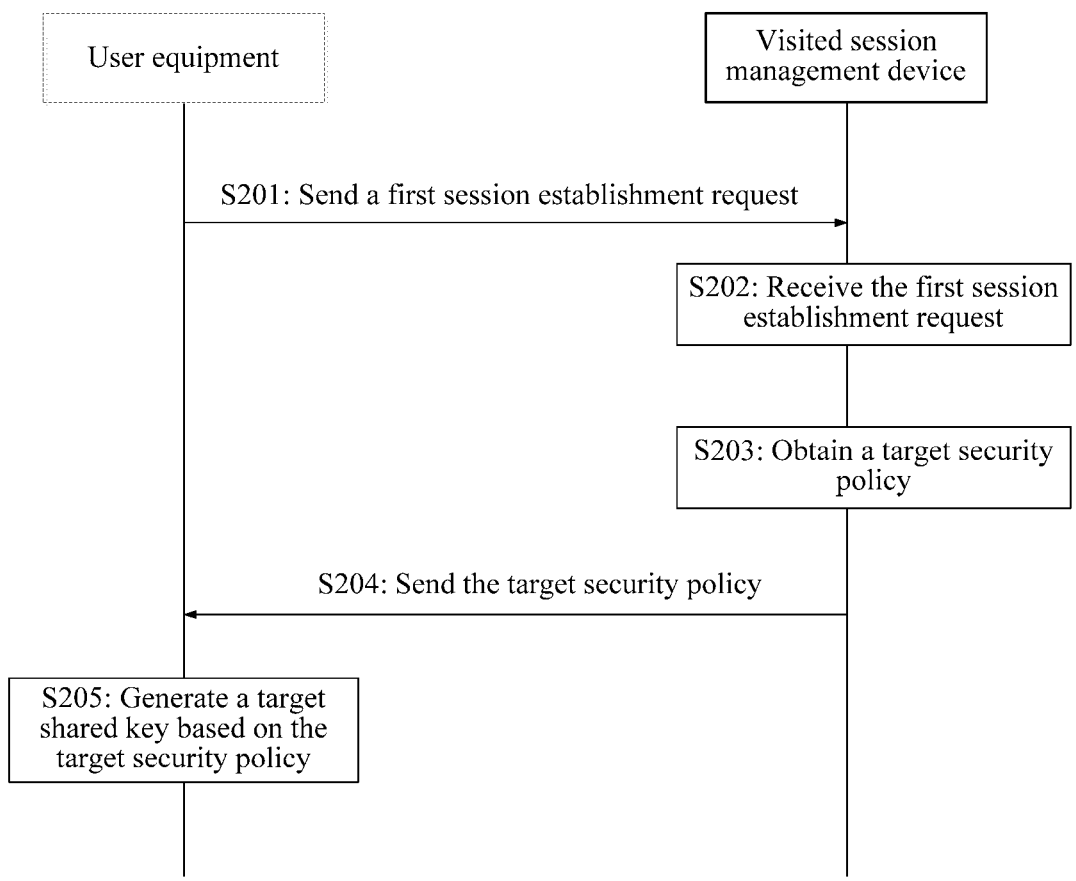
FIG. 2 is a schematic flowchart of a network roaming protection method according to an embodiment of the present invention.

FIG. 2 is a schematic flowchart of a network roaming protection method according to an embodiment of the present invention. The method includes but is not limited to the following steps.

Step S201: User equipment UE sends a first session establishment request to a visited session management device.

Specifically, when roaming into a visited network VPLMN, the UE sends a session (session) establishment request to a session management device in the VPLMN, the session management device in the VPLMN is the visited session management device V-SM, and the session establishment request sent by the UE to the V-SM may be referred to as the first session establishment request. The first session establishment request and information about the UE in an attach (attach) process in the VPLMN may be integrated together and sent. The first session establishment request may include information such as a first security requirement set and an identity UEID of the user equipment.

The first security requirement set includes a security requirement of the UE and a security requirement of a target service, and the security requirement defines at least one of an acceptable key algorithm, an acceptable key length, and an acceptable key update period. The security requirement herein defines at least one of the acceptable key algorithm, the acceptable key length, and the acceptable key update period, and the target service is a service that is currently performed by the UE. For example, when being transmitted, service data of the target service needs to be encrypted by using a key, and therefore the security requirement of the target service indicates a key algorithm through which the key may be calculated, a key length of which the key may be, and a key update period of which the key is, and the like. For another example, when the UE transmits data in a network, the data needs to be encrypted by using a key, and therefore the security requirement of the UE indicates a key algorithm through which the key may be calculated, a key length of which the key may be, and a key update period of which the key may be, and the like. Remaining types of security requirements may be deduced by analogy.

The UEID is used to indicate, to the V-SM, a device from which the first session establishment request is. The UEID may be information for distinguishing the UE and another device within a particular range, for example, a Media Access Control (English: Media Access Control, MAC for short) address, an Internet Protocol (IP) address, a mobile number, an international mobile equipment identity (IMEI), an international mobile subscriber identity (IMSI), an IP multimedia private identity (IMPI), a temporary mobile subscriber identity (TMSI), an IP multimedia public identity (IMPU), or a globally unique temporary UE identity (GUTI) of the UE.

Step S202: The visited session management device receives the first session establishment request sent by the user equipment UE.

Step S203: The visited session management device obtains a target security policy.

Specifically, the visited session management device V-SM responds to the first session establishment request, and a response manner includes obtaining the target security policy. The target security policy is obtained by processing the first security requirement set and a second security requirement set by using a preset rule, the second security requirement set includes at least one of a security requirement of a home gateway and a security requirement of a visited gateway, the home gateway is a user plane gateway that needs to be used when the user equipment accesses a home network, and the visited gateway is a user plane gateway that needs to be used when the user accesses a visited network. It may be understood that, for generation of the target security policy, in addition to factors, namely, the first security requirement set and the second security requirement set that need to be considered, a third security requirement set may further need to be considered, and the third security requirement set includes at least one of a security requirement of a server for providing the target service, a security requirement of a subscription server of the UE, and the security requirement of the visited gateway. The preset rule is generally to determine a set of information such as a key algorithm, a key length, and a key update period, to make each security requirement in the first security requirement set acceptable and each security requirement in the second security requirement set acceptable, and the determined set of information such as the key algorithm, the key length, and the key update period is the target security policy. The target security policy may be generated by the V-SM, or may be generated by another network element and then sent to the V-SM.

A manner in which the visited session management device V-SM obtains the target security policy includes but is not limited to the following situations:

Situation 1. The second security requirement set includes the security requirement of the visited gateway; and that the visited session management device obtains the target security policy is specifically: the visited session management device sends the first security requirement set and the second security requirement set to another device in the visited network VPLMN, for example, sends the first security requirement set and the second security requirement set to a security policy control function (Security Policy Control Function) in the VPLMN, so that the another device in the visited network generates the target security policy based on the first security requirement set and the second security requirement set and sends the target security policy to the visited session management device, and correspondingly the visited session management device H-SM receives the target security policy; or the visited session management device may generate the target security policy based on the first security requirement set and the second security requirement set and based on the preset rule; and the visited session management device pre-stores the security requirement of the visited gateway or the visited session management device obtains the security requirement of the visited gateway from the visited gateway. To be specific in this optional solution, the target security policy is generated by a network element in the VPLMN of the UE.

Situation 2. The second security requirement set includes the security requirement of the home gateway; and that the visited session management device obtains the target security policy is specifically: the visited session management device V-SM sends a second policy request message to a home session management device H-SM, and the second policy request message includes the first security requirement set; and the visited session management device V-SM receives the target security policy sent by the home session management device H-SM, where the target security policy is generated, based on the first security requirement set and the second security requirement set, by a device in the home network triggered by the home session management device after the home session management device receives the second policy request message, and the device in the home network stores the second security requirement set. It may be understood that, the target security policy may be generated by the H-SM or may be generated by another device in the HPLMN, for example, generated by a security policy control function (Security Policy Function) in the HPLMN. When the target security policy is generated by the H-SM, the H-SM may store the second security requirement set in advance, or may obtain the second security requirement set from the security policy control function; or when the target security policy is generated by the security policy control function, the H-SM needs to send the first security requirement set to the security policy control function, and the security policy control function may store the second security requirement set in advance. To be specific in this optional solution, the target security policy is generated by a network element in the HPLMN, and then sent to the V-SM in the VPLMN.

Optionally, when the target security policy is generated in the HPLMN, a network element in the HPLMN may send the target security policy to a network element in the VPLMN for standby application; or when the target security policy is generated in the VPLMN, a network element in the VPLMN may send the target security policy to a network element in the HPLMN for standby application.

Step S204: The visited session management device sends the target security policy to the UE.

Specifically, the reference shared key is a base key of the UE in the home network, a shared key derived based on a base key of the UE in the home network, a base key of the UE in the visited network, or a shared key derived based on a base key of the UE in the visited network; and the base key of the UE in the home network is a key generated by performing two-way authentication between the UE and a key management device in the home network, and the base key of the UE in the visited network is a key generated by performing two-way authentication between the UE and a key management device in the visited network.

A manner of how to derive a new shared key based on the base key of the UE in the home network is described below by using an example, and a derived shared key may be referred to as a transitional shared key K_SID1.

In an optional solution, the transitional shared key K_SID1=KDF(K, (at least one of UEID, slice identifier, network identifier, service parameter, time1, nonce1, and sequence number)). To be specific, for generation of the transitional shared key K_SID1, a base key K of the UE in the home network needs to be considered, and in addition, at least one of the UEID, the slice identifier, the network identifier, the service parameter, time1, nonce1, and the sequence number further needs to be considered.

In another optional solution, the transitional shared key K_SID1=KDF(K, (at least one of slice identifier, network identifier, service parameter, time1, nonce1, and sequence number), UEID, E2E security policy). To be specific, for generation of the transitional shared key K_SID1, a base key K of the UE in the home network, an identity UEID of the UE, and a pre-configured security policy E2E security policy used to define a generation manner of K_SID1 need to be considered, and in addition, at least one of the slice identifier, the network identifier, the service parameter, time1, nonce1, and the sequence number further needs to be considered.

The "slice identifier" may be an identifier of a slice obtained by slicing a service is currently being performed by the UE.

The "network identifier" may be an operator identifier (PLMN ID), an access network identifier (Access Network ID), a serving network identifier (Serving Network ID), a local area network identifier, a bearer identifier (bearer ID), a quality of service identifier (QoS ID), a flow identifier (flow ID), or the like related to the HPLMN, and the network identifier may also be referred to as a network parameter.

The "service parameter" may include information in the service is currently being performed by the UE, such as a sequence number SN, a time stamp, a fresh parameter (Fresh parameter1), a random number (nonce1/random number1), and a service related identifier. The service related identifier may include a device identifier, a session identifier (session ID), a link identifier, an application identifier (App ID), a server identifier (server ID), and the like of a key management system.

The "time1" may be time at which a key is valid, time at which a key is invalid, duration in which a key is valid, or the like.

The "nonce1" is a random number, and is also referred to as a fresh parameter.

It should be noted that, a parameter required by the UE when generating a target shared key may be pre-stored in the UE, or the HPLMN may interact with a network element in the VPLMN to finally send a parameter required by the UE to the UE. Additionally, a principle of deriving a new shared key based on the base key of the UE in the visited network is the same as a principle of deriving a new shared key based on the base key of the UE in the home network, and details are not described herein again.

Step S205: The UE receives the target security policy and generates a target shared key based on a reference shared key and the target security policy.

Specifically, regardless of a key of the foregoing listed keys that the reference shared key is, the UE may generate the target shared key K_SID1' based on the target security policy and the reference shared key that exists in the UE.

For example, the target shared key K_SID1'=KDF (K_SID1, New E2E Policy Set, (at least one of UEID, slice identifier, network identifier, service parameter, time1, nonce1, and sequence number)), where K_SID1 is the reference shared key, and New E2E Policy Set is the target security policy. the formula indicates that for generation of the target shared key K_SID1', the reference shared key K_SID1 and the target security policy New E2E Policy Set need to be considered, and in addition, at least one of the UEID, the slice identifier, the network identifier, the service parameter, time1, nonce1, and the sequence number further needs to be considered. It should be noted that, for the generating, by the UE, the target shared key, in addition to the target security policy and the reference shared key that need to be used, another parameter may further need to be used, and the another parameter may be pre-stored in the UE or may be sent by a network element in the VPLMN or a network element in the HPLMN to the UE.

It should be noted that, the foregoing target shared key may be directly used as an encryption and integrity protection key (that is, integrity protection key), or an encryption and integrity protection key may be obtained after calculation is further performed based on the target shared key. For example, an encryption key K_SID1'_enc=KDF(K_SID1', (at least one of security policy, encryption algorithm identifier, UEID, and session identifier)). To be specific, for generation of the encryption key, the target shared key needs to be considered, and in addition, information such as the security policy, the encryption algorithm identifier, the UEID, and the session identifier may be further considered. The encryption algorithm identifier indicates an encryption algorithm that needs to be used for generating K_SID1'_enc. An integrity protection key K_SID1'_int=KDF(K_SID1', (at least one of Policy Set, integrity protection algorithm identifier, UEID, and session identifier)). To be specific, for generation of the integrity protection key, the target shared key needs to be considered, and in addition, information such as the integrity protection algorithm identifier, the UEID, and the session identifier may be further considered. The integrity protection algorithm identifier indicates an integrity protection algorithm that needs to be used for generating K_SID1'_int.

The target shared key is used to protect secure end-to-end data transmission between the UE and the visited gateway, and the visited gateway is a gateway through which the UE accesses the visited network. After both the UE and the visited gateway use the target shared key as a shared key for protecting secure transmission of data end to end between the UE and the visited network, if data is transmitted between the UE and the visited gateway, the data may be encrypted by using the target shared key or the shared key derived based on the target shared key.

How the visited gateway VUP-GW obtains the target shared key is described below.

In an optional solution, a manner in which the visited session management device obtains the target security policy is the foregoing "situation 1", and after the visited session management device receives the first session establishment request that includes the first security requirement set and that is sent by the user equipment UE, the method further includes: sending, by the visited session management device, a second session establishment request to the home session management device; correspondingly, triggering, by the home session management device based on the second session establishment request, the key management device in the home network to perform two-way authentication with the UE to generate the base key of the UE in the home network; receiving, by the home session management device, the reference shared key sent by the key management device in the home network, where the reference shared key is a base key of the UE in the home network or a shared key derived based on a base key of the UE in the home network; generating, by the home session management device, the target shared key based on the reference shared key and the target security policy; sending, by the home session management device, the target shared key to the visited session management device; receiving, by the visited session management device, the target shared key sent by the home session management device; and sending, by the visited session management device, the target shared key to the visited gateway.

In another optional solution, a manner in which the visited session management device obtains the target security policy is the foregoing "situation 1", and the method further includes: triggering, by the visited session management device, the key management device in the visited network to perform two-way authentication with the UE to generate the base key of the UE in the visited network, where the key management device pre-obtains subscription information, to be used for two-way authentication, of the UE from a network element in the home network; receiving, by the visited session management device, the reference shared key sent by the key management device in the visited network, and sending the reference shared key to the home session management device, where the reference shared key is a base key of the UE in the visited network or a shared key derived based on a base key of the UE in the visited network; generating, by the home session management device, the target shared key based on the target security policy and the reference shared key; and receiving, by the visited session management device, the target shared key sent by the home session management device, and sending the target shared key to the visited gateway.

In another optional solution, a manner in which the visited session management device obtains the target security policy is the foregoing "situation 1" or "situation 2", and after the visited session management device receives the first session establishment request that includes the first security requirement set and that is sent by the user equipment UE, the method further includes: sending, by the visited session management device, a second session establishment request to the home session management device; triggering, by the home session management device based on the second session establishment request, the key management device in the home network to perform two-way authentication with the UE to generate the base key of the UE in the home network; sending, by the key management device in the home network, the reference shared key to the home session management device, where the reference shared key is a base key of the UE in the home network or a shared key derived based on a base key of the UE in the home network; sending, by the home session management device, the reference shared key to the visited session management device; and generating, by the visited session management device, the target shared key based on the target security policy and the reference shared key, and sending the target shared key to the visited gateway.

In another optional solution, a manner in which the visited session management device obtains the target security policy is the foregoing "situation 1" or "situation 2", and the method further includes: triggering, by the visited session management device, the key management device in the visited network to perform two-way authentication with the UE to generate the base key of the UE in the visited network, where the key management device pre-obtains subscription information, to be used for two-way authentication, of the UE from a network element in the home network; receiving, by the visited session management device, the reference shared key sent by the key management device in the visited network, where the reference shared key is a base key of the UE in the visited network or a shared key derived based on a base key of the UE in the visited network; and generating, by the visited session management device, the target shared key based on the target security policy and the reference shared key, and sending the target shared key to the visited gateway.

In another optional solution, a manner in which the visited session management device obtains the target security policy is the foregoing "situation 2", and after the visited session management device receives the first session establishment request that includes the first security requirement set and that is sent by the user equipment UE, the method further includes: sending, by the visited session management device, a second session establishment request to the home session management device, and triggering, by the home session management device based on the second session establishment request, the key management device in the home network to perform two-way authentication with the UE to generate the base key of the UE in the home network, where the second session establishment request includes the target security policy; sending, by the key management device in the home network, the reference shared key to the home session management device, where the reference shared key is a base key of the UE in the home network or a shared key derived based on a base key of the UE in the home network; generating, by the home session management device, the target shared key based on the target security policy and the reference shared key; and receiving, by the visited session management device, the target shared key sent by the home session management device, and sending, by the visited session management device, the target shared key to the visited gateway.

In another optional solution, a manner in which the visited session management device obtains the target security policy is the foregoing "situation 2", and the method further includes: triggering, by the visited session management device, the key management device in the visited network to perform two-way authentication with the UE to generate the base key of the UE in the visited network, where the key management device pre-obtains subscription information, to be used for two-way authentication, of the UE from a network element in the home network; receiving, by the visited session management device, the reference shared key sent by the key management device in the visited network, where the reference shared key is a base key of the UE in the visited network or a shared key derived based on a base key of the UE in the visited network; sending, by the visited session management device, the reference shared key and the target security policy to the home session management device; and generating, by the home session management device, the target shared key based on the target security policy and the reference shared key, and receiving, by the visited session management device, the target shared key sent by the home session management device, and sending the target shared key to the visited gateway.

It should be noted that, when the target shared key is generated by a network element in the visited network VPLMN, the visited session management device V-SM may further send the target shared key to the home session management device H-SM in the home network HPLMN. In this way, the H-SM may parse, based on the target shared key, data transmitted between the UE and the V-SM, to monitor on the UE.

This embodiment of the present invention further covers a local breakout roaming (Local breakout roaming) scenario. The local breakout roaming scenario is specifically that roaming is from a user plane gateway HUP-GW of the HPLMN into a gateway UP-GW of a local network, and then network data is directly obtained from the local network.

To better understand solutions according to this embodiment of the present invention, a plurality of more specific solutions are provided below with reference to FIG. 3A to 3G to further describe the embodiment shown in FIG. 2.

Figure 3A:
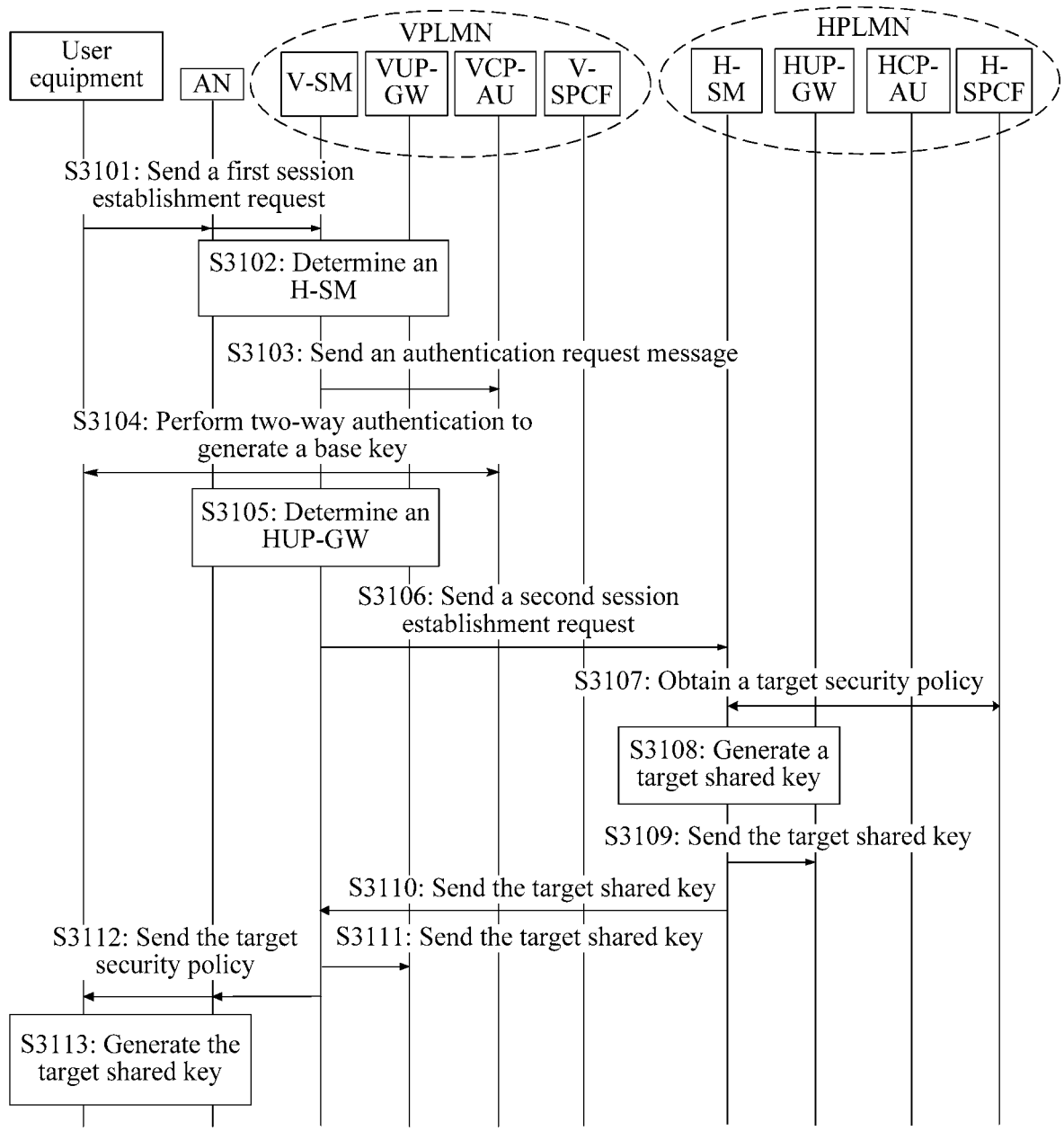
FIG. 3A is a schematic flowchart of another network roaming protection method according to an embodiment of the present invention.

FIG. 3A is a schematic flowchart of another network roaming protection method according to an embodiment of the present invention. Related network elements include user equipment UE, a home session management device H-SM, a visited session management device V-SM, a key management device HCP-AU in a home network, a key management device VCP-AU in a visited network, a home gateway HUP-GW, a visited gateway VUP-GW, a security policy control function H-SPCF in the home network, and a security policy control function V-SPCF in the visited network. The process is as follows:

Step S3101: The UE sends a first session (session) establishment request to the V-SM, where the first session establishment request may carry information such as a first security requirement set and an identity UEID of the UE, and the first security requirement set may include a security requirement of the UE (which may also be referred to as "a security capability of the UE"), a security requirement of a target service that the UE is currently performing, and the like.

Step S3102: The V-SM receives the first session establishment request and obtains information in the first session establishment request through parsing. Then, the V-SM may determine the home network HPLMN of the UE based on the information such as the UEID, and further determine an SM that is in the HPLMN and with which the V-SM needs to interact subsequently, where the determined SM is the H-SM.

Step S3103: The V-SM sends an authentication request message to the VCP-AU.

Step S3104: The VCP-AU receives the authentication request message and performs two-way authentication with the UE to obtain a user plane base key. A network authentication manner may be the Authentication and Key Agreement (English: Authentication and Key Agreement, AKA for short) of a 3rd-generation mobile communications network, the Generic Bootstrapping Architecture (English: Generic Bootstrapping Architecture, GBA for short), the Kerberos protocol, or the like. For the two-way authentication performed by the VCP-AU with the UE, subscription information between the UE and an operator to which the UE is homed needs to be used. In a solution, the request message carries the subscription information; and in another solution, the request message carries the UEID of the UE. The VCP-AU determines a home network of the UE based on the UEID, and then obtains the subscription information from a network element (for example, a home network subscription server such as an Authentication Authorization and Accounting device (English: Authentication Authorization Accounting, AAA for short) in the home network.

Step S3105: The V-SM selects an appropriate user plane path, that is, selects a user plane gateway UP-GW of the UE in the visited network VPLMN for the UE, where the UP-GW selected for the UE is the VUP-GW.

Step S3106: The V-SM sends a second session establishment request to the H-SM, where the second session establishment request includes information such as a reference shared key, the first security requirement set of the UE, and the UEID of the UE, and may further include another security policy. The reference shared key includes but is not limited to the following situations:

Situation 1: The reference shared key is the foregoing user plane base key.

Situation 2: The reference shared key is a session key generated based on the foregoing user plane base key, and if so, after generating the user plane base key, the VCP-AU further needs to generate the session key based on the user plane base key.

Step S3107: The H-SM receives the second session establishment request, obtains, through parsing, information in the session key, and then sends an update request to the preset security policy control function H-SPCF, and correspondingly, the security policy control function H-SPCF responds to the update request, and processes, by using a preset rule, the first security requirement set in the second session establishment request and a second security requirement set that is stored in the security policy control function H-SPCF to obtain a target security policy. Alternatively, the H-SM may process the first security requirement set and the second security requirement set based on the preset rule to obtain the target security policy, and the H-SM stores the second security requirement set or requests the second security requirement set from the security policy control function, where the second security requirement may include security requirements of network elements in the HPLMN, for example, a security requirement of the HCP-AU and a security requirement of the HUP-GW.

Step S3108: The H-SM generates, based on the target security policy and the reference shared key, a shared key for protecting secure transmission of data end to end between the UE and the VUP-GW in the visited network, where the shared key may be referred to as a target shared key for convenience of description.

Step S3109: The H-SM sends the target shared key to the user plane gateway HUP-GW in the HPLMN. Correspondingly, the HUP-GW receives the target shared key. In this way, the HUP-GW may subsequently monitor, based on the target shared key, a session of the UE that is encrypted by using the target shared key.

Step S3110: The H-SM sends the target shared key and the target security policy to the V-SM.

Step S3111: The V-SM receives the target shared key and the target security policy and sends the target shared key to the user plane gateway VUP-GW in the VPLMN, and may further send the target shared key to the VCP-AU for storage.

Step S3112: The V-SM sends the target security policy to the UE.

Step S3113: The UE receives the target security policy and the reference shared key and generates the target shared key. It should be noted that, generation of the target shared key may further need to be based on other information, for example, a session identifier of a session that currently needs to be established or the UEID. If the UE does not have the information to which reference needs to be made, the information may be sent by the V-SM to the UE.

It should be noted that, steps may be performed in an order described above, or may be not performed completely in the described order, provided that no logical problem exists.

After the foregoing operations are performed, the target shared key exists between the UE and the HUP-GW in the HPLMN, and the target shared key exists between the UE and the VUP-GW in the VPLMN. Therefore, the UE and the VUP-GW may protect secure transmission of data end to end based on the target shared key, and the HUP-GW may monitor, based on the target shared key, data transmitted between the UE and the VUP-GW.

Figure 3B:
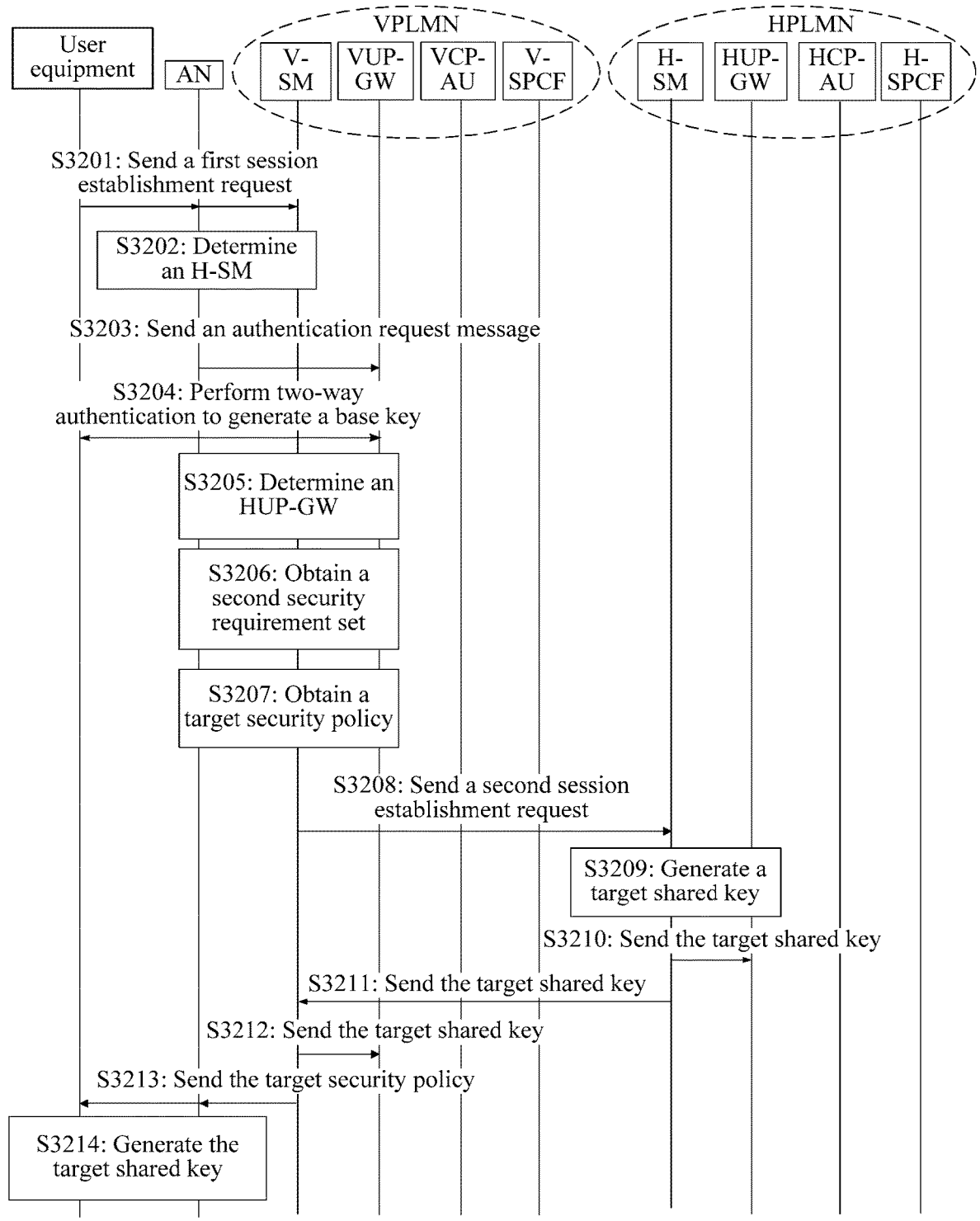
FIG. 3B is a schematic flowchart of another network roaming protection method according to an embodiment of the present invention.

FIG. 3B is a schematic flowchart of another network roaming protection method according to an embodiment of the present invention. Related network elements include user equipment UE, a home session management device H-SM, a visited session management device V-SM, a key management device HCP-AU in a home network, a key management device VCP-AU in a visited network, a home gateway HUP-GW, a visited gateway VUP-GW, a security policy control function H-SPCF in the home network, and a security policy control function V-SPCF in the visited network. The process is as follows:

Step S3201: The UE sends a first session (session) establishment request to the V-SM, where the first session establishment request may carry information such as a first security requirement set and an identity UEID of the UE, and the first security requirement set may include a security requirement of the UE, a security requirement of a target service that the UE is currently performing, and the like.

Step S3202: The V-SM receives the first session establishment request and obtains information in the first session establishment request through parsing. Then, the V-SM may determine the home network HPLMN of the UE based on the UEID, and further determine an SM that is in the HPLMN and with which the V-SM needs to interact subsequently, where the determined SM is the H-SM.

Step S3203: The V-SM sends an authentication request message to the VCP-AU.

Step S3204: The VCP-AU receives the authentication request message and performs two-way authentication with the UE to obtain a user plane base key, where a network authentication manner may be the Authentication and Key Agreement (English: Authentication and Key Agreement, AKA for short) of a 3rd-generation mobile communications network, the Generic Bootstrapping Architecture (English: Generic Bootstrapping Architecture, GBA for short), the Kerberos protocol, or the like. For the two-way authentication performed by the VCP-AU with the UE, subscription information between the UE and an operator to which the UE is homed needs to be used. In a solution, the request message carries the subscription information; and in another solution, the request message carries the UEID of the UE. The VCP-AU determines a home network of the UEID based on the UEID, and then obtains the subscription information from a network element in the home network.

Step S3205: The V-SM selects an appropriate user plane path, that is, selects a user plane gateway UP-GW of the UE in the visited network VPLMN for the UE, where the UP-GW selected for the UE is the VUP-GW.

Step S3206: The V-SM obtains a second security requirement set, where the second security requirement set includes a security requirement of the VUP-GW, and the V-SM may obtain the security requirement of the VUP-GW from the VUP-GW, or may request the security requirement of the VUP-GW from another device storing the security requirement of the VUP-GW. Further, the V-SM may further obtain, from the H-SM, a security requirement of the UE that is default in a subscription server.

Step S3207: The V-SM processes the first security requirement set and the second security requirement set based on a preset rule to obtain a new security policy. Generation of the new security policy may further need to be based on another security policy (for example, the security requirement of the UE that is default in the subscription server). For convenience of description, the new security policy may be referred to as a target security policy. Alternatively, the V-SM sends information such as the first security requirement set and the second security requirement set to the security policy control function V-SPCF that is in the visited network VPLMN and that is pre-configured to manage a security policy, and the security policy control function V-SPCF obtains the target security policy based on the information such as the first security requirement set and the second security requirement set.

Step S3208: The V-SM sends a second session establishment request to the H-SM, where the second session establishment request includes information such as a reference shared key, the target security policy, and the UEID of the UE. The reference shared key includes but is not limited to the following situations:

Situation 1: The reference shared key is the foregoing user plane base key.

Situation 2: The reference shared key is a session key generated based on the foregoing user plane base key, and if so, after generating the user plane base key, the VCP-AU further needs to generate the session key based on the user plane base key.

Step S3209: The H-SM generates, based on the target security policy and the reference shared key, a shared key for protecting secure transmission of data end to end between the UE and the VUP-GW in the visited network, where the shared key may be referred to as a target shared key for convenience of description.

Step S3210: The H-SM sends the target shared key to the user plane gateway HUP-GW in the HPLMN. Correspondingly, the HUP-GW receives the target shared key. In this way, the HUP-GW may subsequently monitor, based on the target shared key, a session of the UE that is encrypted by using the target shared key.

Step S3211: The H-SM sends the target shared key to the V-SM.

Step S3212: The V-SM receives the target shared key and the target security policy and sends the target shared key to the user plane gateway VUP-GW in the VPLMN, and may further send the target shared key to the VCP-AU for storage.

Step S3213: The V-SM sends the target security policy to the UE.

Step S3214: The UE receives the target security policy and the reference shared key and generates the target shared key. It should be noted that, generation of the target shared key may further need to be based on other information, for example, a session identifier of a session that currently needs to be established or the UEID. If the UE does not have the information to which reference needs to be made, the information may be sent by the V-SM to the UE.

It should be noted that, steps may be performed in an order described above, or may be not performed completely in the described order, provided that no logical problem exists.

After the foregoing operations are performed, the target shared key exists between the UE and the HUP-GW in the HPLMN, and the target shared key exists between the UE and the VUP-GW in the VPLMN. Therefore, the UE and the VUP-GW may protect secure transmission of data end to end based on the target shared key, and the HUP-GW may monitor, based on the target shared key, data transmitted between the UE and the VUP-GW.

Figure 3C:
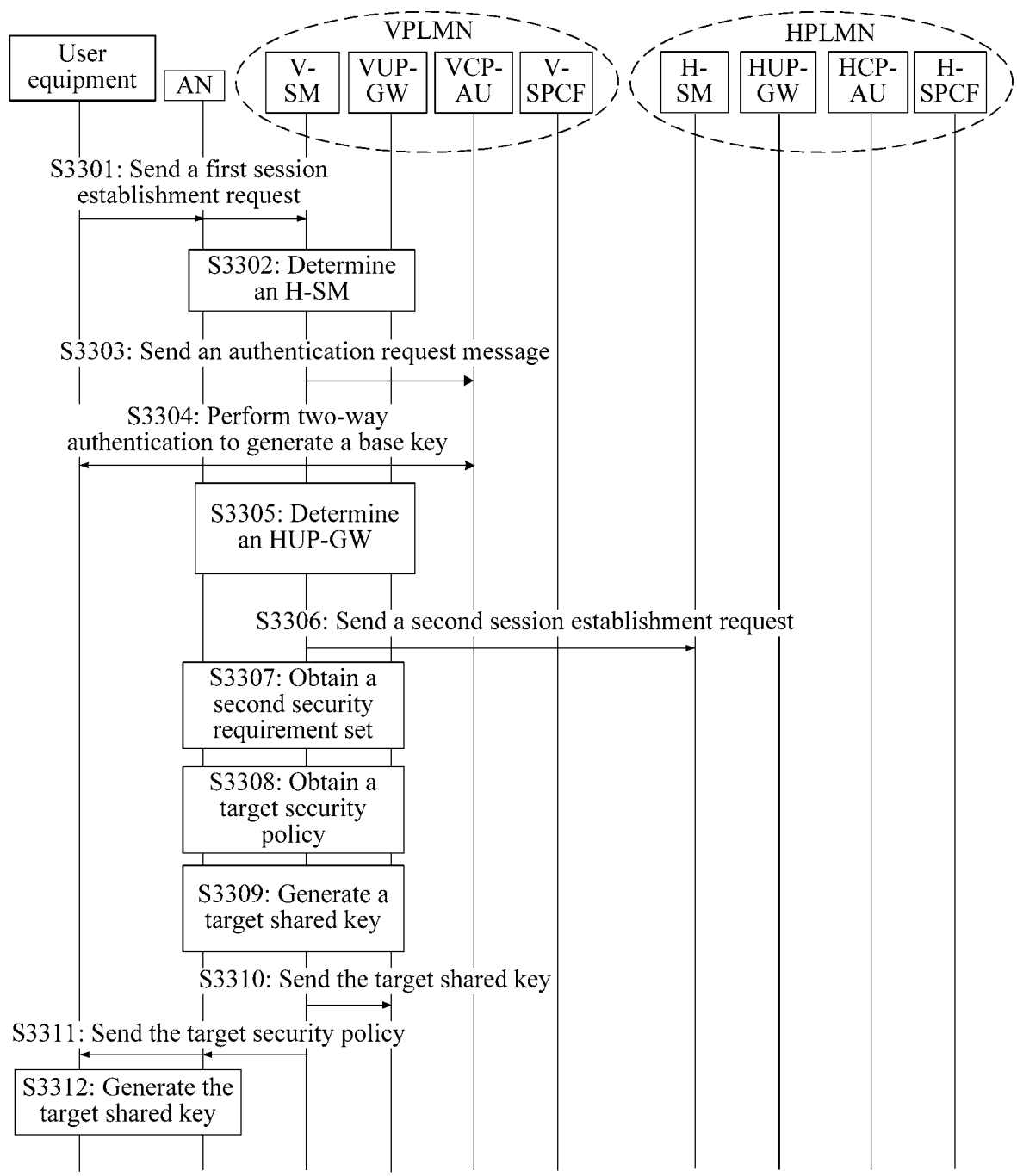
FIG. 3C is a schematic flowchart of a network roaming protection method according to an embodiment of the present invention.

FIG. 3C is a schematic flowchart of another network roaming protection method according to an embodiment of the present invention. Related network elements include user equipment UE, a home session management device H-SM, a visited session management device V-SM, a key management device HCP-AU in a home network, a key management device VCP-AU in a visited network, a home gateway HUP-GW, a visited gateway VUP-GW, a security policy control function H-SPCF in the home network, and a security policy control function V-SPCF in the visited network. The process is as follows:

Step S3301: The UE sends a first session (session) establishment request to the V-SM, where the first session establishment request may carry information such as a first security requirement set of the UE and an identity UEID of the UE, and the first security requirement set may include a security requirement of the UE, a security requirement of a target service that the UE is currently performing, and the like.

Step S3302: The V-SM receives the first session establishment request and obtains information in the first session establishment request through parsing. Then, the V-SM may determine the home network HPLMN of the UE based on the UEID, and further determine an SM that is in the HPLMN and with which the V-SM needs to interact subsequently, where the determined SM is the H-SM.

Step S3303: The V-SM sends an authentication request message to the VCP-AU.

Step S3304: The VCP-AU receives the authentication request message and performs two-way authentication with the UE to obtain a user plane base key, where a network authentication manner may be the Authentication and Key Agreement (English: Authentication and Key Agreement, AKA for short) of a 3rd-generation mobile communications network, the Generic Bootstrapping Architecture (English: Generic Bootstrapping Architecture, GBA for short), the Kerberos protocol, or the like. For the two-way authentication performed by the VCP-AU with the UE, subscription information between the UE and an operator to which the UE is homed needs to be used. In a solution, the request message carries the subscription information; and in another solution, the request message carries the UEID of the UE. The VCP-AU determines a home network of the UEID based on the UEID, and then obtains the subscription information from a network element in the home network.

Step S3305: The V-SM selects an appropriate user plane path, that is, selects a user plane gateway UP-GW of the UE in the visited network VPLMN for the UE, where the UP-GW selected for the UE is the VUP-GW.

Step S3306: The V-SM sends a second session establishment request to the H-SM, where the second session establishment request includes information such as the UEID of the UE.

Step S3307: The V-SM obtains a second security requirement set, where the second security requirement set includes a security requirement of the VUP-GW, and the V-SM may obtain the security requirement of the VUP-GW from the VUP-GW, or may request the security requirement of the VUP-GW from another device storing the security requirement of the VUP-GW. Further, the V-SM may further obtain, from the H-SM, a security requirement of the UE that is default in a subscription server.

Step S3308: The V-SM processes the first security requirement set and the second security requirement set based on a preset rule to obtain a new security policy. Generation of the new security policy may further need to be based on another security policy (for example, the security requirement of the UE that is default in the subscription server). For convenience of description, the new security policy may be referred to as a target security policy. Alternatively, the V-SM sends information such as the first security requirement set and the second security requirement set to the security policy control function V-SPCF that is in the visited network VPLMN and that is pre-configured to manage a security policy, and the security policy control function V-SPCF obtains the target security policy based on the information such as the first security requirement set and the second security requirement set.

Step S3309: The V-SM generates, based on the target security policy and a reference shared key, a shared key for protecting secure transmission of data end to end between the UE and the VUP-GW in the visited network, where the shared key may be referred to as a target shared key for convenience of description. Generation of the target shared key may further need to be based on other information, for example, a session identifier of a session that currently needs to be established or the UEID. If the UE does not have the information to which reference needs to be made, the information may be sent by the V-SM to the UE. The reference shared key includes but is not limited to the following situations:

Situation 1: The reference shared key is the foregoing user plane base key.

Situation 2: The reference shared key is a session key generated based on the foregoing user plane base key, and if so, after generating the user plane base key, the VCP-AU further needs to generate the session key based on the user plane base key.

Step S3310: The V-SM sends the target shared key to the user plane gateway VUP-GW in the VPLMN, and may further send the target shared key to the VCP-AU for storage.

Step S3311: The V-SM sends the target security policy and/or the target shared key to the UE.

Step S3312: The UE receives the target security policy and the reference shared key and generates the target shared key. It should be noted that, generation of the target shared key may further need to be based on other information, for example, a session identifier of a session that currently needs to be established or the UEID. If the UE does not have the information to which reference needs to be made, the information may be sent by the V-SM to the UE.

Optionally, the V-SM further sends the target shared key to the H-SM, and correspondingly, the H-SM receives the target shared key and sends the target shared key to the user plane gateway HUP-GW in the HPLMN. Correspondingly, the HUP-GW receives the target shared key. In this way, the HUP-GW may subsequently monitor, based on the target shared key, a session of the UE that is encrypted by using the target shared key.

It should be noted that, steps may be performed in an order described above, or may be not performed completely in the described order, provided that no logical problem exists.

After the foregoing operations are performed, the target shared key exists between the UE and the HUP-GW in the HPLMN, and the target shared key exists between the UE and the VUP-GW in the VPLMN. Therefore, the UE and the VUP-GW may protect secure transmission of data end to end based on the target shared key, and the HUP-GW may monitor, based on the target shared key, data transmitted between the UE and the VUP-GW.

Figure 3D:
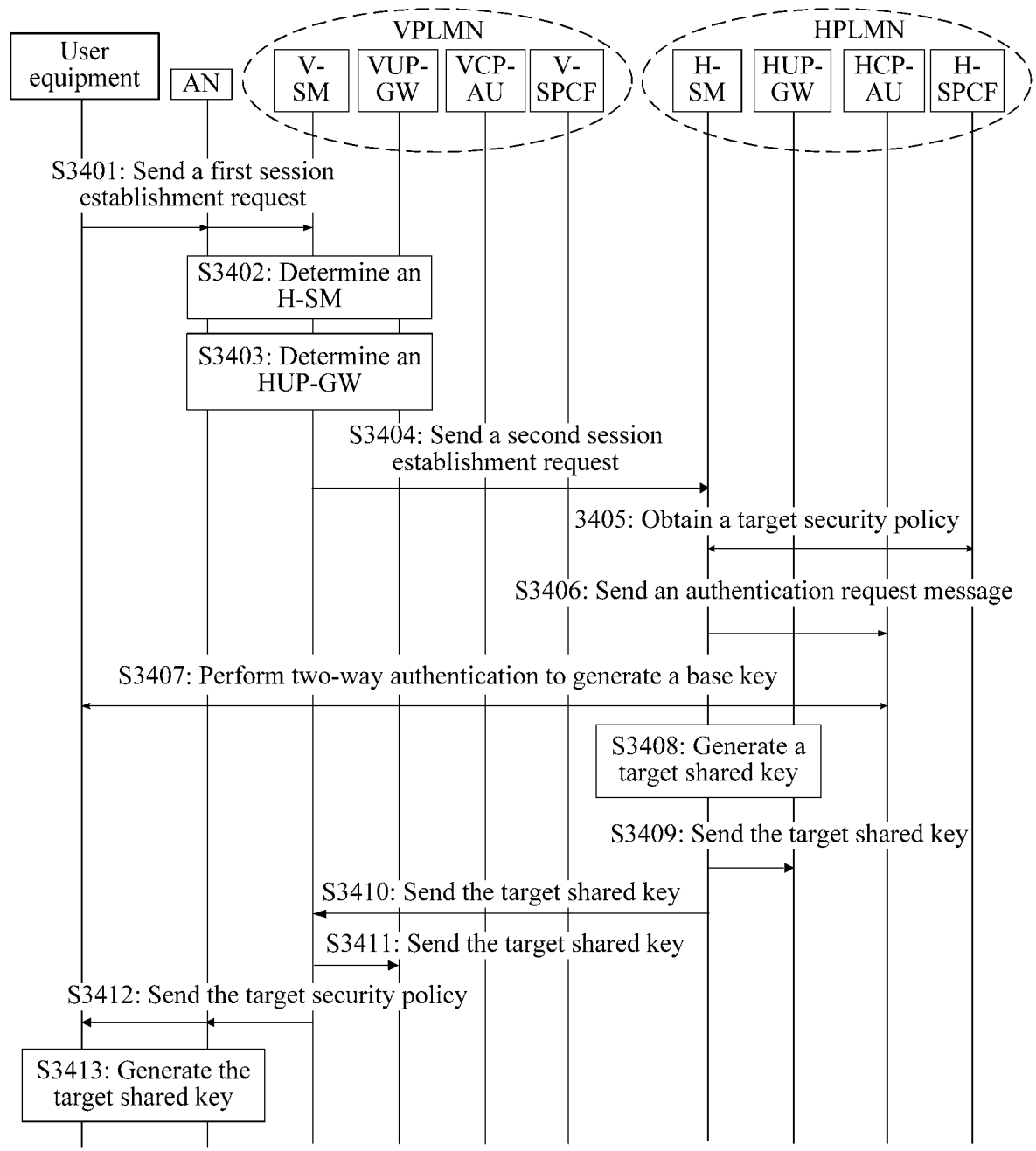
FIG. 3D is a schematic flowchart of another network roaming protection method according to an embodiment of the present invention.

FIG. 3D is a schematic flowchart of another network roaming protection method according to an embodiment of the present invention. Related network elements include user equipment UE, a home session management device H-SM, a visited session management device V-SM, a key management device HCP-AU in a home network, a key management device VCP-AU in a visited network, a home gateway HUP-GW, a visited gateway VUP-GW, a security policy control function H-SPCF in the home network, and a security policy control function V-SPCF in the visited network. The process is as follows:

Step S3401: The UE sends a first session (session) establishment request to the V-SM, where the first session establishment request may carry information such as a first security requirement set of the UE and an identity UEID of the UE, and the first security requirement set may include a security requirement of the UE, a security requirement of a target service that the UE is currently performing, and the like.

Step S3402: The V-SM receives the first session establishment request and obtains information in the first session establishment request through parsing. Then, the V-SM may determine the home network HPLMN of the UE based on the UEID, and further determine an SM that is in the HPLMN and with which the V-SM needs to interact subsequently, where the determined SM is the H-SM.

Step S3403: The V-SM selects an appropriate user plane path, that is, selects a user plane gateway UP-GW of the UE in the visited network VPLMN for the UE, where the UP-GW selected for the UE is the VUP-GW.

Step S3404: The V-SM sends a second session establishment request to the H-SM, where the second session establishment request includes information such as the first security requirement set of the UE and the UEID of the UE, and may further include another security policy.

Step S3405: The H-SM receives the second session establishment request, obtains, through parsing, information in the second session key, and then sends an update request to the preset security policy control function, and correspondingly, the security policy control function responds to the update request, and processes, by using a preset rule, the first security requirement set in the second session establishment request and a second security requirement set that is stored in the security policy control function H-SPCF to obtain a target security policy. Alternatively, the H-SM may process the first security requirement set and the second security requirement set based on the preset rule to obtain the target security policy, and the H-SM stores the second security requirement set or requests the second security requirement set from the security policy control function, where the second security requirement may include security requirements of network elements in the HPLMN, for example, a security requirement of the HCP-AU.

Step S3406: The H-SM sends an authentication request message to the HCP-AU.

Step S3407: The HCP-AU receives the authentication request message and performs two-way authentication with the UE to obtain a user plane base key, where a network authentication manner may be the Authentication and Key Agreement (English: Authentication and Key Agreement, AKA for short) of a 3rd-generation mobile communications network, the Generic Bootstrapping Architecture (English: Generic Bootstrapping Architecture, GBA for short), the Kerberos protocol, or the like. For the two-way authentication performed by the HCP-AU with the UE, subscription information between the UE and an operator to which the UE is homed needs to be used. The HCP-AU may store the subscription information, or the HCP-AU may obtain the subscription information from a network element that is in the home network HPLMN of the UE and that stores the subscription information. It may be understood that, because the UE has already accessed the HPLMN, the UE and the network element in the HPLMN have already been authenticated. Therefore, a base key that needs to be used in this embodiment of the present invention and a key derived based on the base key may also be generated by the UE in the HPLMN previously.

Step S3408: The H-SM generates, based on the target security policy and the reference shared key, a shared key for protecting secure transmission of data end to end between the UE and the VUP-GW in the visited network, where the shared key may be referred to as a target shared key for convenience of description. It should be noted that, the reference shared key includes but is not limited to the following situations:

Situation 1: The reference shared key is the foregoing user plane base key.

Situation 2: The reference shared key is a session key generated based on the foregoing user plane base key, and if so, after generating the user plane base key, the HCP-AU further needs to generate the session key based on the user plane base key.

Step S3409: The H-SM sends the target shared key to the user plane gateway HUP-GW in the HPLMN. Correspondingly, the HUP-GW receives the target shared key. In this way, the HUP-GW may subsequently monitor, based on the target shared key, a session of the UE that is encrypted by using the target shared key.

Step S3410: The H-SM sends the target shared key and the target security policy to the V-SM.

Step S3411: The V-SM receives the target shared key and the target security policy and sends the target shared key to the user plane gateway VUP-GW in the VPLMN, and may further send the target shared key to the VCP-AU for storage.

Step S3412: The V-SM sends the target security policy to the UE.

Step S3413: The UE receives the target security policy and the reference shared key and generates the target shared key. It should be noted that, generation of the target shared key may further need to be based on other information, for example, a session identifier of a session that currently needs to be established or the UEID. If the UE does not have the information to which reference needs to be made, the information may be sent by the V-SM to the UE.

It should be noted that, steps may be performed in an order described above, or may be not performed completely in the described order, provided that no logical problem exists.

After the foregoing operations are performed, the target shared key exists between the UE and the HUP-GW in the HPLMN, and the target shared key exists between the UE and the VUP-GW in the VPLMN. Therefore, the UE and the VUP-GW may protect secure transmission of data end to end based on the target shared key, and the HUP-GW may monitor, based on the target shared key, data transmitted between the UE and the VUP-GW.

Figure 3E:
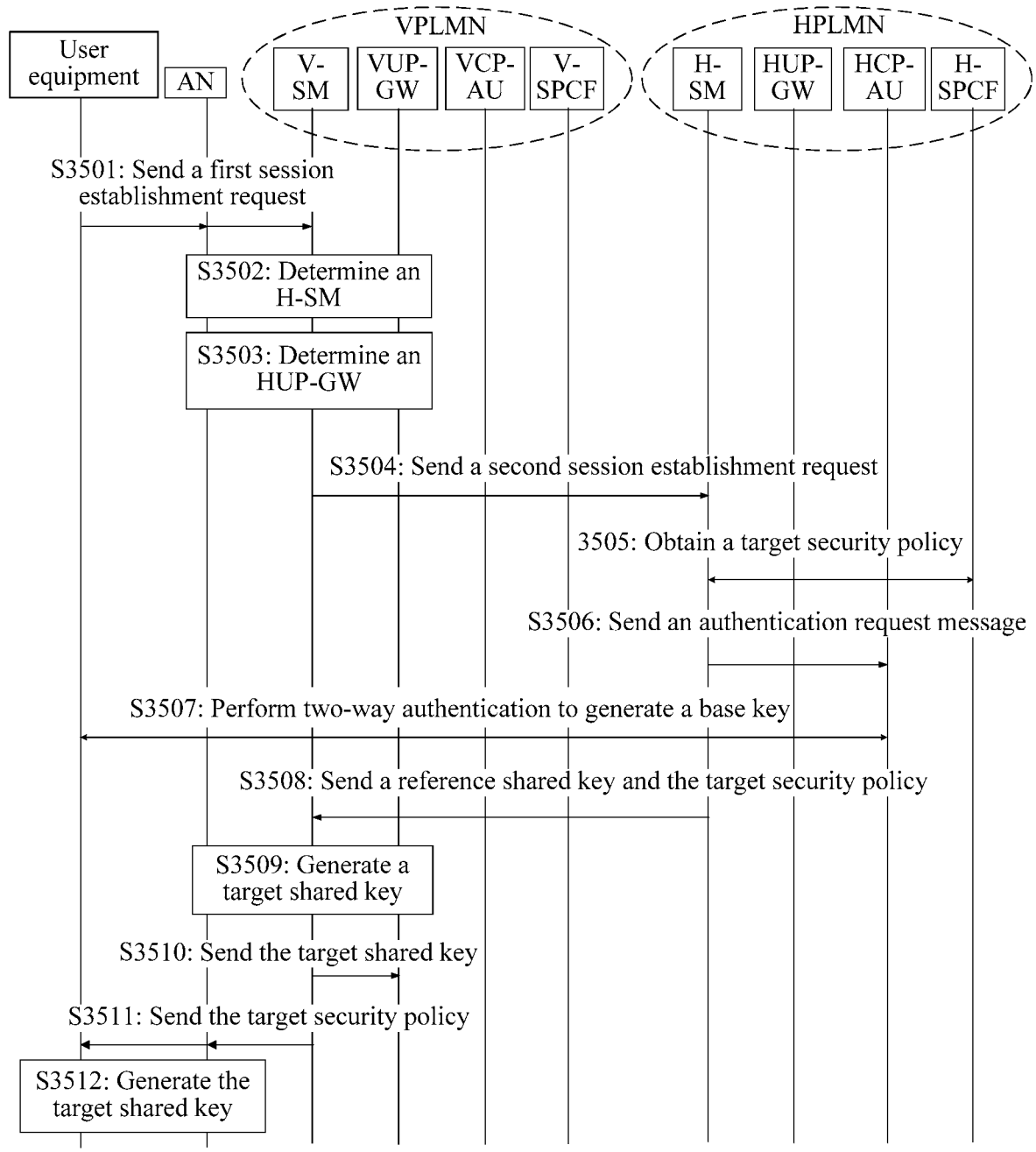
FIG. 3E is a schematic flowchart of another network roaming protection method according to an embodiment of the present invention.

FIG. 3E is a schematic flowchart of another network roaming protection method according to an embodiment of the present invention. Related network elements include user equipment UE, a home session management device H-SM, a visited session management device V-SM, a key management device HCP-AU in a home network, a key management device VCP-AU in a visited network, a home gateway HUP-GW, a visited gateway VUP-GW, a security policy control function H-SPCF in the home network, and a security policy control function V-SPCF in the visited network. The process is as follows:

Step S3501: The UE sends a first session (session) establishment request to the V-SM, where the first session establishment request may carry information such as a first security requirement set of the UE and an identity UEID of the UE, and the first security requirement set may include a security requirement of the UE, a security requirement of a target service that the UE is currently performing, and the like.

Step S3502: The V-SM receives the first session establishment request and obtains information in the first session establishment request through parsing. Then, the V-SM may determine the home network HPLMN of the UE based on the UEID, and further determine an SM that is in the HPLMN and with which the V-SM needs to interact subsequently, where the determined SM is the H-SM.

Step S3503: The V-SM selects an appropriate user plane path, that is, selects a user plane gateway UP-GW of the UE in the visited network VPLMN for the UE, where the UP-GW selected for the UE is the VUP-GW.

Step S3504: The V-SM sends a second session establishment request to the H-SM, where the second session establishment request includes information such as the first security requirement set of the UE and the UEID of the UE, and may further include another security policy.

Step S3505: The H-SM receives the second session establishment request, obtains, through parsing, information in the second session key, and then sends an update request to the preset security policy control function, and correspondingly, the security policy control function responds to the update request, and processes, by using a preset rule, the first security requirement set in the second session establishment request and a second security requirement set that is stored in the security policy control function H-SPCF to obtain a target security policy. Alternatively, the H-SM may process the first security requirement set and the second security requirement set based on the preset rule to obtain the target security policy, and the H-SM stores the second security requirement set or requests the second security requirement set from the security policy control function, where the second security requirement set may include security requirements of network elements in the HPLMN, for example, a security requirement of the HCP-AU and a security requirement of the HUP-GW.

Step S3506: The H-SM sends an authentication request message to the HCP-AU.

Step S3507: The HCP-AU receives the authentication request message and performs two-way authentication with the UE to obtain a user plane base key, where a network authentication manner may be the Authentication and Key Agreement (English: Authentication and Key Agreement, AKA for short) of a 3rd-generation mobile communications network, the Generic Bootstrapping Architecture (English: Generic Bootstrapping Architecture, GBA for short), the Kerberos protocol, or the like. For the two-way authentication performed by the HCP-AU with the UE, subscription information between the UE and an operator to which the UE is homed needs to be used. The HCP-AU may store the subscription information, or the HCP-AU may obtain the subscription information from a network element that is in the home network HPLMN of the UE and that stores the subscription information. It may be understood that, because the UE has already accessed the HPLMN, the UE and the network element in the HPLMN have already been authenticated. Therefore, a base key that needs to be used in this embodiment of the present invention and a key derived based on the base key may also be generated by the UE in the HPLMN previously.

Step S3508: The H-SM sends the target security policy and a reference shared key to the V-SM. It should be noted that, the reference shared key includes but is not limited to the following situations:

Situation 1: The reference shared key is the foregoing user plane base key.

Situation 2: The reference shared key is a session key generated based on the foregoing user plane base key, and if so, after generating the user plane base key, the HCP-AU further needs to generate the session key based on the user plane base key.

Step S3509: The V-SM receives the target security policy and the reference shared key, and generates, based on the target security policy and a reference shared key, a shared key for protecting secure transmission of data end to end between the UE and the VUP-GW in the visited network, where the shared key may be referred to as a target shared key for convenience of description.

Step S3510: The V-SM sends the target shared key to the user plane gateway VUP-GW in the VPLMN, and may further send the target shared key to the VCP-AU for storage.

Step S3511: The V-SM sends the target security policy to the UE.

Step S3512: The UE receives the target security policy and the reference shared key and generates the target shared key. It should be noted that, generation of the target shared key may further need to be based on other information, for example, a session identifier of a session that currently needs to be established or the UEID. If the UE does not have the information to which reference needs to be made, the information may be sent by the V-SM to the UE.

Optionally, the V-SM further sends the target shared key to the H-SM, and correspondingly, the H-SM receives the target shared key and sends the target shared key to the user plane gateway HUP-GW in the HPLMN. Correspondingly, the HUP-GW receives the target shared key. In this way, the HUP-GW may subsequently monitor, based on the target shared key, a session of the UE that is encrypted by using the target shared key.

It should be noted that, steps may be performed in an order described above, or may be not performed completely in the described order, provided that no logical problem exists.

After the foregoing operations are performed, the target shared key exists between the UE and the HUP-GW in the HPLMN, and the target shared key exists between the UE and the VUP-GW in the VPLMN. Therefore, the UE and the VUP-GW may protect secure transmission of data end to end based on the target shared key, and the HUP-GW may monitor, based on the target shared key, data transmitted between the UE and the VUP-GW.

Figure 3F:
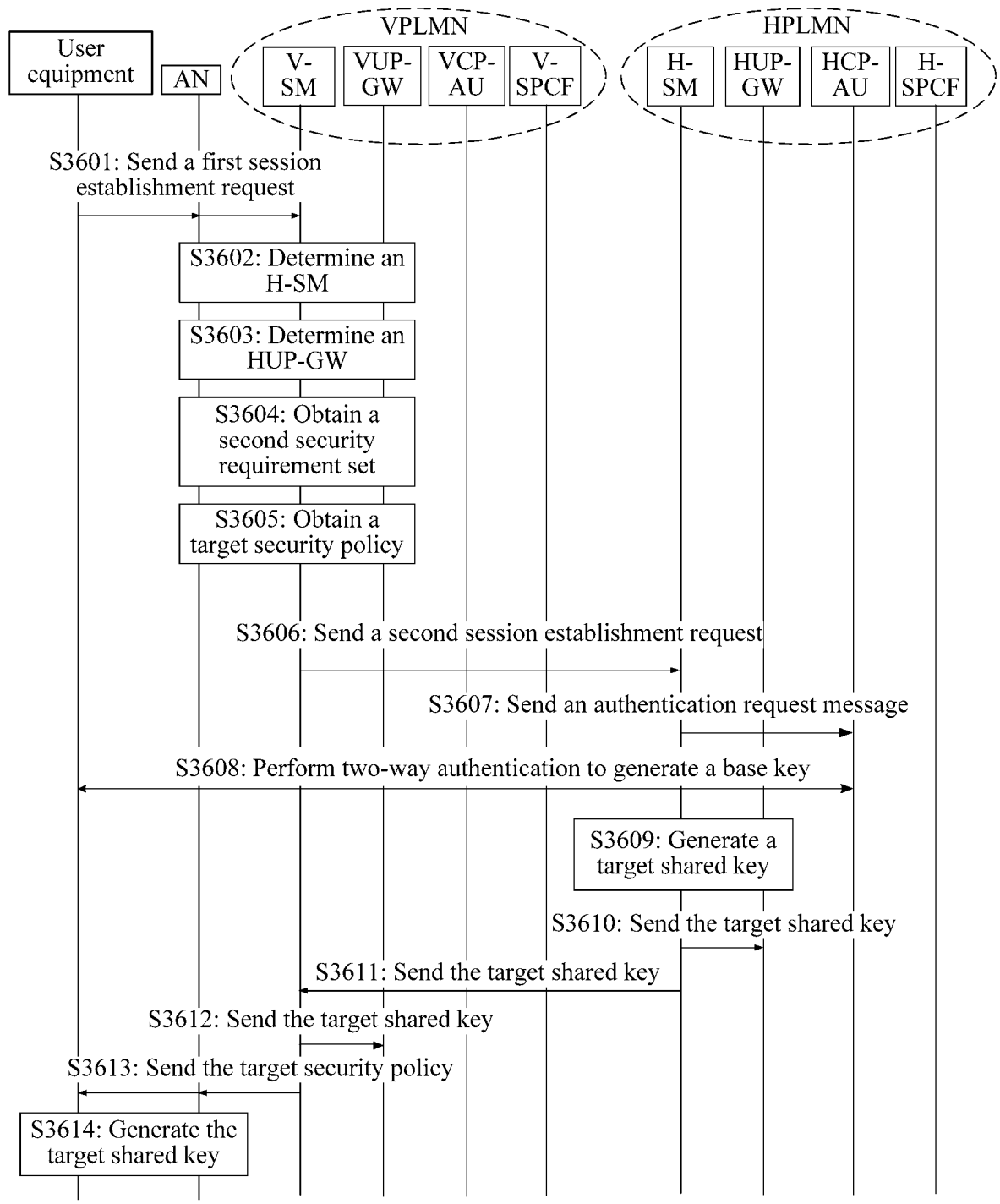
FIG. 3F is a schematic flowchart of a network roaming protection method according to an embodiment of the present invention.

FIG. 3F is a schematic flowchart of another network roaming protection method according to an embodiment of the present invention. Related network elements include user equipment UE, a home session management device H-SM, a visited session management device V-SM, a key management device HCP-AU in a home network, a key management device VCP-AU in a visited network, a home gateway HUP-GW, a visited gateway VUP-GW, a security policy control function H-SPCF in the home network, and a security policy control function V-SPCF in the visited network. The process is as follows:

Step S3601: The UE sends a first session (session) establishment request to the V-SM, where the first session establishment request may carry information such as a first security requirement set of the UE and an identity UEID of the UE, and the first security requirement set may include a security requirement of the UE, a security requirement of a target service that the UE is currently performing, and the like.

Step S3602: The V-SM receives the first session establishment request and obtains information in the first session establishment request through parsing. Then, the V-SM may determine the home network HPLMN of the UE based on the UEID, and further determine an SM that is in the HPLMN and with which the V-SM needs to interact subsequently, where the determined SM is the H-SM.

Step S3603: The V-SM selects an appropriate user plane path, that is, selects a user plane gateway UP-GW of the UE in the visited network VPLMN for the UE, where the UP-GW selected for the UE is the VUP-GW.

Step S3604: The V-SM obtains a second security requirement set, where the second security requirement set includes a security requirement of the VUP-GW, and the V-SM may obtain the security requirement of the VUP-GW from the VUP-GW, or may request the security requirement of the VUP-GW from another device storing the security requirement of the VUP-GW. Further, the V-SM may further obtain, from the H-SM, a security requirement of the UE that is default in a subscription server.

Step S3605: The V-SM processes the first security requirement set and the second security requirement set based on a preset rule to obtain a new security policy. Generation of the new security policy may further need to be based on another security policy (for example, the security requirement of the UE that is default in the subscription server). For convenience of description, the new security policy may be referred to as a target security policy. Alternatively, the V-SM sends information such as the first security requirement set and the second security requirement set to the security policy control function V-SPCF that is in the visited network VPLMN and that is pre-configured to manage a security policy, and the security policy control function V-SPCF obtains the target security policy based on the information such as the first security requirement set and the second security requirement set.

Step S3606: The V-SM sends a second session establishment request to the H-SM, where the second session establishment request includes information such as the target security policy and the UEID of the UE.

Step S3607: The H-SM sends an authentication request message to the HCP-AU.

Step S3608: The HCP-AU receives the authentication request message and performs two-way authentication with the UE to obtain a user plane base key, where a network authentication manner may be the Authentication and Key Agreement (English: Authentication and Key Agreement, AKA for short) of a 3rd-generation mobile communications network, the Generic Bootstrapping Architecture (English: Generic Bootstrapping Architecture, GBA for short), the Kerberos protocol, or the like. For the two-way authentication performed by the HCP-AU with the UE, subscription information between the UE and an operator to which the UE is homed needs to be used. The HCP-AU may store the subscription information, or the HCP-AU may obtain the subscription information from another network element in the home network HPLMN. It may be understood that, because the UE has already accessed the HPLMN, the UE and the network element in the HPLMN have already been authenticated. Therefore, a base key that needs to be used in this embodiment of the present invention and a key derived based on the base key may also be generated by the UE in the HPLMN previously.

Step S3609: The H-SM generates, based on the target security policy and a reference shared key, a shared key for protecting secure transmission of data end to end between the UE and the VUP-GW in the visited network, where the shared key may be referred to as a target shared key for convenience of description. The reference shared key includes but is not limited to the following situations:

Situation 1: The reference shared key is the foregoing user plane base key.

Situation 2: The reference shared key is a session key generated based on the foregoing user plane base key, and if so, after generating the user plane base key, the HCP-AU further needs to generate the session key based on the user plane base key.

Step S3610: The H-SM sends the target shared key to the user plane gateway HUP-GW in the HPLMN. Correspondingly, the HUP-GW receives the target shared key. In this way, the HUP-GW may subsequently monitor, based on the target shared key, a session of the UE that is encrypted by using the target shared key.

Step S3611: The H-SM sends the target shared key and the target security policy to the V-SM.

Step S3612: The V-SM receives the target shared key and the target security policy and sends the target shared key to the user plane gateway VUP-GW in the VPLMN, and may further send the target shared key to the VCP-AU for storage.

Step S3613: The V-SM sends the target security policy to the UE.

Step S3614: The UE receives the target security policy and the reference shared key and generates the target shared key. It should be noted that, generation of the target shared key may further need to be based on other information, for example, a session identifier of a session that currently needs to be established or the UEID. If the UE does not have the information to which reference needs to be made, the information may be sent by the V-SM to the UE.

It should be noted that, steps may be performed in an order described above, or may be not performed completely in the described order, provided that no logical problem exists.

After the foregoing operations are performed, the target shared key exists between the UE and the HUP-GW in the HPLMN, and the target shared key exists between the UE and the VUP-GW in the VPLMN. Therefore, the UE and the VUP-GW may protect secure transmission of data end to end based on the target shared key, and the HUP-GW may monitor, based on the target shared key, data transmitted between the UE and the VUP-GW.

Figure 3G:
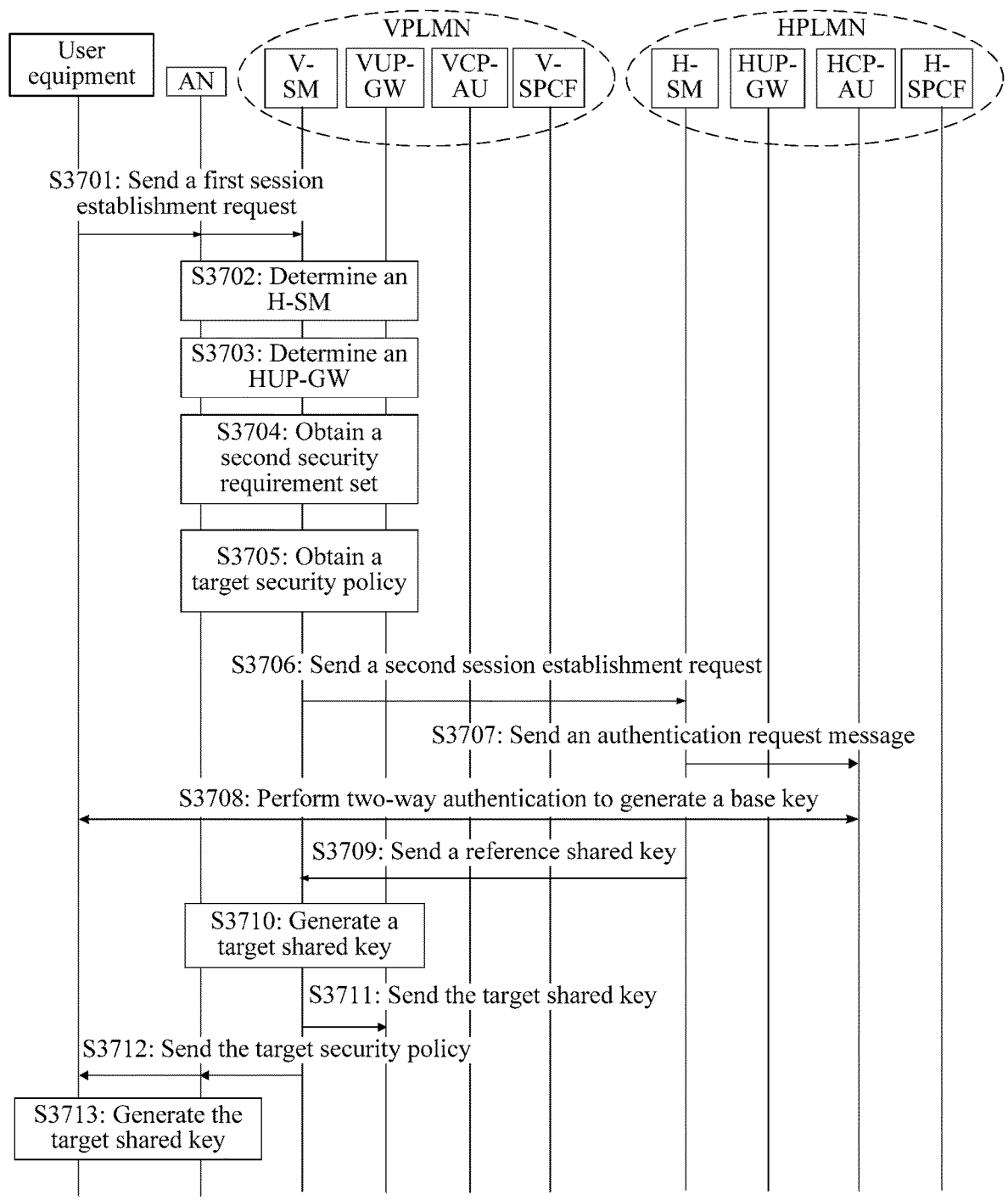
FIG. 3G is a schematic flowchart of a network roaming protection method according to an embodiment of the present invention.

FIG. 3G is a schematic flowchart of another network roaming protection method according to an embodiment of the present invention. Related network elements include user equipment UE, a home session management device H-SM, a visited session management device V-SM, a key management device HCP-AU in a home network, a key management device VCP-AU in a visited network, a home gateway HUP-GW, a visited gateway VUP-GW, a security policy control function H-SPCF in the home network, and a security policy control function V-SPCF in the visited network. The process is as follows:

Step S3701: The UE sends a first session (session) establishment request to the V-SM, where the first session establishment request may carry information such as a first security requirement set of the UE and an identity UEID of the UE, and the first security requirement set may include a security requirement of the UE, a security requirement of a target service that the UE is currently performing, and the like.

Step S3702: The V-SM receives the first session establishment request and obtains information in the first session establishment request through parsing. Then, the V-SM may determine the home network HPLMN of the UE based on the UEID, and further determine an SM that is in the HPLMN and with which the V-SM needs to interact subsequently, where the determined SM is the H-SM.

Step S3703: The V-SM selects an appropriate user plane path, that is, selects a user plane gateway UP-GW of the UE in the visited network VPLMN for the UE, where the UP-GW selected for the UE is the VUP-GW.

Step S3704: The V-SM obtains a second security requirement set, where the second security requirement set includes a security requirement of the VUP-GW, and the V-SM may obtain the security requirement of the VUP-GW from the VUP-GW, or may request the security requirement of the VUP-GW from another device storing the security requirement of the VUP-GW. Further, the V-SM may further obtain, from the H-SM, a security requirement of the UE that is default in a subscription server.

Step S3705: The V-SM processes the first security requirement set and the second security requirement set based on a preset rule to obtain a new security policy. Generation of the new security policy may further need to be based on another security policy (for example, the security requirement of the UE that is default in the subscription server). For convenience of description, the new security policy may be referred to as a target security policy. Alternatively, the V-SM sends information such as the first security requirement set and the second security requirement set to the security policy control function V-SPCF that is in the visited network VPLMN and that is pre-configured to manage a security policy, and the security policy control function V-SPCF obtains the target security policy based on the information such as the first security requirement set and the second security requirement set.

Step S3706: The V-SM sends a second session establishment request to the H-SM, where the second session establishment request includes information such as the UEID of the UE.

Step S3707: The H-SM sends an authentication request message to the HCP-AU based on the second session establishment request.

Step S3708: The HCP-AU receives the authentication request message and performs two-way authentication with the UE to obtain a user plane base key, where a network authentication manner may be the Authentication and Key Agreement (English: Authentication and Key Agreement, AKA for short) of a 3rd-generation mobile communications network, the Generic Bootstrapping Architecture (English: Generic Bootstrapping Architecture, GBA for short), the Kerberos protocol, or the like. For the two-way authentication performed by the HCP-AU with the UE, subscription information between the UE and an operator to which the UE is homed needs to be used. The HCP-AU may store the subscription information, or the HCP-AU may obtain the subscription information from another network element in the home network HPLMN. It may be understood that, because the UE has already accessed the HPLMN, the UE and the network element in the HPLMN have already been authenticated. Therefore, a base key that needs to be used in this embodiment of the present invention and a key derived based on the base key may also be generated by the UE in the HPLMN previously.

Step S3709: The HCP-AU sends a reference shared key to the H-SM, and correspondingly, the H-SM receives the reference shared key and forwards the reference shared key to the V-SM.

Step S3710: The V-SM generates, based on the target security policy and a reference shared key, a shared key for protecting secure transmission of data end to end between the UE and the VUP-GW in the visited network, where the shared key may be referred to as a target shared key for convenience of description. Generation of the target shared key may further need to be based on other information, for example, a session identifier of a session that currently needs to be established or the UEID. If the UE does not have the information to which reference needs to be made, the information may be sent by the V-SM to the UE. The reference shared key includes but is not limited to the following situations:

Situation 1: The reference shared key is the foregoing user plane base key.

Situation 2: The reference shared key is a session key generated based on the foregoing user plane base key, and if so, after generating the user plane base key, the VCP-AU further needs to generate the session key based on the user plane base key.

Step S3711: The V-SM sends the target shared key to the user plane gateway VUP-GW in the VPLMN, and may further send the target shared key to the VCP-AU for storage.

Step S3712: The V-SM sends the target security policy to the UE.

Step S3713: The UE receives the target security policy and the reference shared key and generates the target shared key. It should be noted that, generation of the target shared key may further need to be based on other information, for example, a session identifier of a session that currently needs to be established or the UEID. If the UE does not have the information to which reference needs to be made, the information may be sent by the V-SM to the UE.

Optionally, the V-SM further sends the target shared key to the H-SM, and correspondingly, the H-SM receives the target shared key and sends the target shared key to the user plane gateway HUP-GW in the HPLMN. Correspondingly, the HUP-GW receives the target shared key. In this way, the HUP-GW may subsequently monitor, based on the target shared key, a session of the UE that is encrypted by using the target shared key.

It should be noted that, steps may be performed in an order described above, or may be not performed completely in the described order, provided that no logical problem exists.

After the foregoing operations are performed, the target shared key exists between the UE and the HUP-GW in the HPLMN, and the target shared key exists between the UE and the VUP-GW in the VPLMN. Therefore, the UE and the VUP-GW may protect secure transmission of data end to end based on the target shared key, and the HUP-GW may monitor, based on the target shared key, data transmitted between the UE and the VUP-GW.

In the foregoing method embodiments, when the UE roams into the visited network, the target security policy is generated by using a network element in the home network or the visited network, and the target security policy covers security requirements of some network elements in the home network and security requirements of some network elements in the visited network; further, the reference shared key is processed with reference to the rule defined by the target security policy to generate the target shared key, and the reference shared key is a key that is generated by performing, by the UE, two-way authentication in the home network or the visited network or that is further derived; and finally, the UE and the visited gateway in the visited network use the target shared key as a shared key for protecting secure end-to-end data transmission between the UE and the visited gateway, so that the UE can still securely transmit the data after network roaming.

Methods according to the embodiments of the present invention are described in detail above. For convenience of better implementing the foregoing solutions according to the embodiments of the present invention, correspondingly, apparatuses according to the embodiments of the present invention are provided below.

Figure 4:
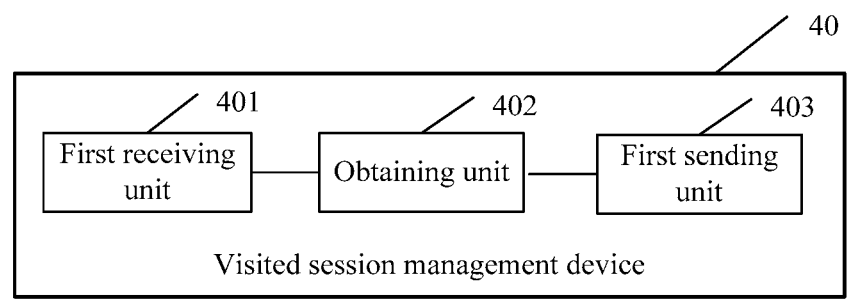
FIG. 4 is a schematic structural diagram of a visited session management device according to an embodiment of the present invention.

FIG. 4 is a schematic structural diagram of a visited session management device 40 according to an embodiment of the present invention. The visited session management device includes a first receiving unit 401, an obtaining unit 402, and a first sending unit 403, where units are described in detail as follows:

The first receiving unit 401 is configured to receive a first session establishment request that includes a first security requirement set and that is sent by user equipment UE, where the first security requirement set includes a security requirement of the UE and a security requirement of a target service, the security requirement defines at least one of an acceptable key algorithm, an acceptable key length, and an acceptable key update period, the target service is a service that is currently performed by the UE, and the visited session management device 40 is a session management device in a visited network of the UE.

The obtaining unit 402 is configured to obtain a target security policy, where the target security policy is obtained by processing the first security requirement set and a second security requirement set by using a preset rule, the second security requirement set includes at least one of a security requirement of a visited gateway and a security requirement of a home gateway, the visited gateway is a user plane gateway used when the UE accesses the visited network, and the home gateway is a user plane gateway used when the UE accesses a home network of the UE.

The first sending unit 403 is configured to send the target security policy to the UE, so that the UE generates a target shared key based on a reference shared key and according to a rule defined by the target security policy, where the reference shared key is a base key of the UE in the home network, a shared key derived based on a base key of the UE in the home network, a base key of the UE in the visited network, or a shared key derived based on a base key of the UE in the visited network; the base key of the UE in the home network is a key generated by performing, by the UE, two-way authentication with a key management device in the home network, and the base key of the UE in the visited network is a key generated by performing, by the UE, two-way authentication with a key management device in the visited network; and the target shared key is used to protect secure end-to-end data transmission between the UE and the visited gateway.

By running the foregoing units, when the UE roams into the visited network, the target security policy is generated by using a network element in the home network or the visited network, and the target security policy covers security requirements of some network elements in the home network and security requirements of some network elements in the visited network; further, the reference shared key is processed with reference to the rule defined by the target security policy to generate the target shared key, and the reference shared key is a key that is generated by performing, by the UE, two-way authentication in the home network or the visited network or that is further derived; and finally, the UE and the visited gateway in the visited network use the target shared key as a shared key for protecting secure end-to-end data transmission between the UE and the visited gateway, so that the UE can still securely transmit the data after network roaming.

In an optional solution, the second security requirement set includes the security requirement of the visited gateway; and the obtaining unit 402 is specifically configured to send the first security requirement set and the second security requirement set to another device in the visited network, so that the another device in the visited network generates the target security policy based on the first security requirement set and the second security requirement set and sends the target security policy to the visited session management device 40, or the visited session management device 40 generates the target security policy based on the first security requirement set and the second security requirement set; and the visited session management device 40 pre-stores the security requirement of the visited gateway or the visited session management device 40 obtains the security requirement of the visited gateway from the visited gateway.

In another optional solution, the second security requirement set includes the security requirement of the home gateway; and the obtaining unit 402 is specifically configured to:

send a second policy request message to a home session management device, where the second policy request message includes the first security requirement set, and the home session management device is a session management device in the home network of the UE; and receive the target security policy sent by the home session management device, where the target security policy is generated, based on the first security requirement set and the second security requirement set, by a device in the home network triggered by the home session management device after the home session management device receives the second policy request message, and the device in the home network stores the second security requirement set.

In another optional solution, when the reference shared key is a base key of the UE in the home network or a shared key derived based on a base key of the UE in the home network, the visited session management device 40 further includes:

a second sending unit, configured to: after the first receiving unit 401 receives the first session establishment request that includes the first security requirement set and that is sent by the user equipment UE, send a second session establishment request to the home session management device, so that the home session management device triggers the key management device in the home network to perform two-way authentication with the UE to generate the base key of the UE in the home network;

a second receiving unit, configured to receive the target shared key sent by the home session management device, where the target shared key is generated by the home session management device based on the target security policy and the reference shared key, and the reference shared key is sent by the key management device in the home network; and a third sending unit, configured to send the target shared key to the visited gateway.

In another optional solution, when the reference shared key is a base key of the UE in the visited network or a shared key derived based on a base key of the UE in the visited network, the visited session management device 40 further includes:

a first triggering unit, configured to trigger the key management device in the visited network to perform two-way authentication with the UE to generate the base key of the UE in the visited network, where the key management device pre-obtains subscription information, to be used for two-way authentication, of the UE from a network element in the home network;

a third receiving unit, configured to receive the reference shared key sent by the key management device in the visited network, and send the reference shared key to the home session management device; and a fourth receiving unit, configured to receive the target shared key sent by the home session management device, and send the target shared key to the visited gateway, where the target shared key is generated by the home session management device based on the target security policy and the reference shared key.

In another optional solution, when the reference shared key is a base key of the UE in the home network or a shared key derived based on a base key of the UE in the home network, the visited session management device 40 further includes:

a fourth sending unit, configured to: after the first receiving unit 401 receives the first session establishment request that includes the first security requirement set and that is sent by the user equipment UE, send a second session establishment request to the home session management device, so that the home session management device triggers the key management device in the home network to perform two-way authentication with the UE to generate the base key of the UE in the home network;

a fifth receiving unit, configured to receive the reference shared key that is sent by the key management device in the home network and that is forwarded by the home session management device; and a first generation unit, configured to generate the target shared key based on the target security policy and the reference shared key, and send the target shared key to the visited gateway.

In another optional solution, when the reference shared key is a base key of the UE in the visited network or a shared key derived based on a base key of the UE in the visited network, the visited session management device 40 further includes:

a second triggering unit, configured to trigger the key management device in the visited network to perform two-way authentication with the UE to generate the base key of the UE in the visited network, where the key management device pre-obtains subscription information, to be used for two-way authentication, of the UE from a network element in the home network;

a sixth receiving unit, configured to receive the reference shared key sent by the key management device in the visited network; and a second generation unit, configured to generate the target shared key based on the target security policy and the reference shared key, and send the target shared key to the visited gateway.

In another optional solution, when the reference shared key is a base key of the UE in the home network or a shared key derived based on a base key of the UE in the home network, the visited session management device 40 further includes:

a fifth sending unit, configured to: after the first receiving unit 401 receives the first session establishment request that includes the first security requirement set and that is sent by the user equipment UE, send a second session establishment request to the home session management device, so that the home session management device triggers the key management device in the home network to perform two-way authentication with the UE to generate the base key of the UE in the home network; and the second session establishment request includes the target security policy;

a seventh receiving unit, configured to receive the target shared key sent by the home session management device, where the target shared key is generated by the home session management device based on the target security policy and the reference shared key, and the reference shared key is sent by the key management device in the home network; and a sixth sending unit, configured to send the target shared key to the visited gateway.

In another optional solution, when the reference shared key is a base key of the UE in the visited network or a shared key derived based on a base key of the UE in the visited network, the visited session management device 40 further includes:

a third triggering unit, configured to trigger the key management device in the visited network to perform two-way authentication with the UE to generate the base key of the UE in the visited network, where the key management device pre-obtains subscription information, to be used for two-way authentication, of the UE from a network element in the home network;

an eighth receiving unit, configured to receive the reference shared key sent by the key management device in the visited network, and send the reference shared key and the target security policy to the home session management device; and a ninth receiving unit, configured to receive the target shared key sent by the home session management device, and send the target shared key to the visited gateway, where the target shared key is generated by the home session management device based on the target security policy and the reference shared key.

In another optional solution, the target security policy is obtained by processing the first security requirement set, a second security requirement, and a third security requirement set by using the preset rule, and the third security requirement set includes at least one of a security requirement of a server for providing the target service and a security requirement of a subscription server of the UE.

It should be noted that, specific implementation of the units may further correspond to corresponding description of the method embodiment shown with reference to FIG. 2.

In the visited session management device 40 described in FIG. 4, when the UE roams into the visited network, the target security policy is generated by using a network element in the home network or the visited network, and the target security policy covers security requirements of some network elements in the home network and security requirements of some network elements in the visited network; further, the reference shared key is processed with reference to the rule defined by the target security policy to generate the target shared key, and the reference shared key is a key that is generated by performing, by the UE, two-way authentication in the home network or the visited network or that is further derived; and finally, the UE and the visited gateway in the visited network use the target shared key as a shared key for protecting secure end-to-end data transmission between the UE and the visited gateway, so that the UE can still securely transmit the data after network roaming.

Figure 5:
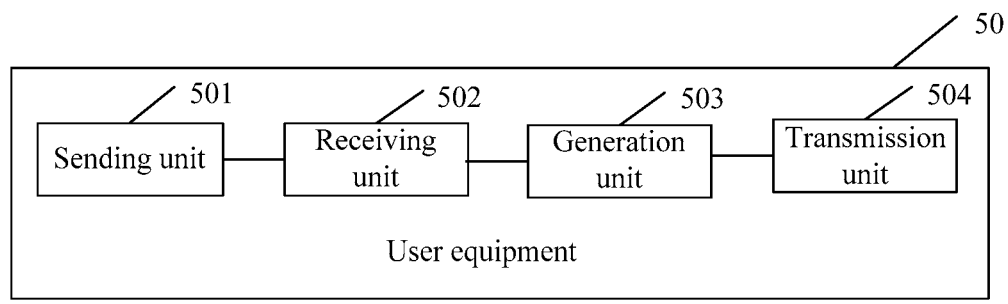
FIG. 5 is a schematic structural diagram of user equipment according to an embodiment of the present invention.

FIG. 5 is a schematic structural diagram of user equipment 50 according to an embodiment of the present invention. The user equipment 50 includes a sending unit 501, a receiving unit 502, a generation unit 503, and a transmission unit 504, where units are described in detail as follows:

The sending unit 501 is configured, by the UE, to send a first session establishment request including a first security requirement set to a visited session management device, where the first security requirement set includes a security requirement of the UE and a security requirement of a target service, the security requirement defines at least one of an acceptable key algorithm, an acceptable key length, and an acceptable key update period, the target service is a service that is currently performed by the UE, and the visited session management device is a session management device in a visited network of the UE.

The receiving unit 502 is configured to receive a target security policy sent by the visited session management device, where the target security policy is obtained by processing the first security requirement set and a second security requirement set by using a preset rule, the second security requirement set includes at least one of a security requirement of a visited gateway and a security requirement of a home gateway, the visited gateway is a user plane gateway used when the UE accesses the visited network, and the home gateway is a user plane gateway used when the UE accesses a home network of the UE.

The generation unit 503 is configured to generate a target shared key based on a reference shared key and according to a rule defined by the target security policy, where the reference shared key is a base key of the UE in the home network, a shared key derived based on a base key of the UE in the home network, a base key of the UE in the visited network, or a shared key derived based on a base key of the UE in the visited network; and the base key of the UE in the home network is a key generated by performing, by the UE, two-way authentication with a key management device in the home network, and the base key of the UE in the visited network is a key generated by performing, by the UE, two-way authentication with a key management device in the visited network.

The transmission unit 504 is configured to protect secure data transmission between the UE and the visited gateway by using the target shared key.

By running the foregoing units, when the UE roams into the visited network, the target security policy is generated by using a network element in the home network or the visited network, and the target security policy covers security requirements of some network elements in the home network and security requirements of some network elements in the visited network; further, the reference shared key is processed with reference to the rule defined by the target security policy to generate the target shared key, and the reference shared key is a key that is generated by performing, by the UE, two-way authentication in the home network or the visited network or that is further derived; and finally, the UE and the visited gateway in the visited network use the target shared key as a shared key for protecting secure end-to-end data transmission between the UE and the visited gateway, so that the UE can still securely transmit the data after network roaming.

In an optional solution, the reference shared key is a base key of the UE in the home network or a shared key derived based on a base key of the UE in the home network, and the user equipment 50 further includes:

a first authentication unit, configured to: before the generation unit 503 generates the target shared key based on the reference shared key and based on the rule defined by the target security policy, perform two-way authentication with the key management device in the home network to generate the base key of the UE in the home network.

In another optional solution, the reference shared key is a base key of the UE in the visited network or a shared key derived based on a base key of the UE in the visited network; and the user equipment 50 further includes:

a second authentication unit, configured to: before the generation unit 503 generates the target shared key based on the reference shared key and based on the rule defined by the target security policy, perform two-way authentication with the key management device in the visited network to generate the base key of the UE in the visited network, where the key management device pre-obtains subscription information, to be used for two-way authentication, of the UE from a network element in the home network.

It should be noted that, specific implementation of the units may further correspond to corresponding description of the method embodiment shown with reference to FIG. 2.

In the user equipment 50 described in FIG. 5, when the UE roams into the visited network, the target security policy is generated by using a network element in the home network or the visited network, and the target security policy covers security requirements of some network elements in the home network and security requirements of some network elements in the visited network; further, the reference shared key is processed with reference to the rule defined by the target security policy to generate the target shared key, and the reference shared key is a key that is generated by performing, by the UE, two-way authentication in the home network or the visited network or that is further derived; and finally, the UE and the visited gateway in the visited network use the target shared key as a shared key for protecting secure end-to-end data transmission between the UE and the visited gateway, so that the UE can still securely transmit the data after network roaming.

Figure 6:
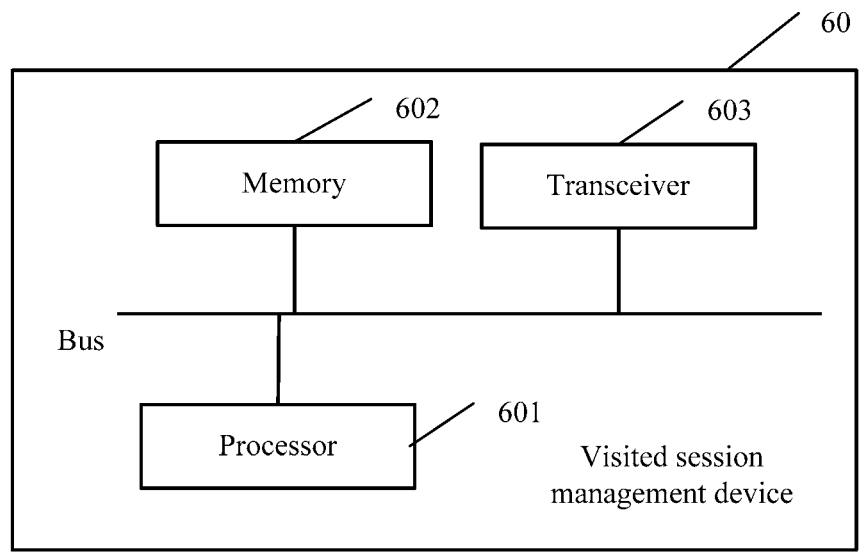
FIG. 6 is a schematic structural diagram of another visited session management device according to an embodiment of the present invention.

FIG. 6 shows another visited session management device 60 according to an embodiment of the present invention. The visited session management device 60 includes a processor 601, a memory 602, and a transceiver 603, and the processor 601, the memory 602, and the transceiver 603 are connected to each other by using a bus.

The memory 602 includes but is not limited to a random access memory (RAM), a read-only memory (ROM), an erasable programmable read-only memory (EPROM or flash memory), or a portable read-only memory (CD-ROM), and the memory 602 is configured to store a related instruction and data.

The transceiver 603 may include a receiver and a transmitter and is, for example, a wireless radio frequency module.

The processor 601 may be one or more central processing units (English: Central Processing Unit, CPU for short). When the processor 601 is one CPU, the CPU may be a single-core CPU or may be a multi-core CPU.

The processor 601 in the visited session management device 60 is configured to read program code stored in the memory 602, to perform the following operations:

receiving, by using the transceiver 603, a first session establishment request that includes a first security requirement set and that is sent by user equipment UE, where the first security requirement set includes a security requirement of the UE and a security requirement of a target service, the security requirement defines at least one of an acceptable key algorithm, an acceptable key length, and an acceptable key update period, the target service is a service that is currently performed by the UE, and the visited session management device is a session management device in a visited network of the UE;

obtaining a target security policy, where the target security policy is obtained by processing the first security requirement set and a second security requirement set by using a preset rule, the second security requirement set includes at least one of a security requirement of a visited gateway and a security requirement of a home gateway, the visited gateway is a user plane gateway used when the UE accesses the visited network, and the home gateway is a user plane gateway used when the UE accesses a home network of the UE; and sending, by using the transceiver 603, the target security policy to the UE, so that the UE generates a target shared key based on a reference shared key and according to a rule defined by the target security policy, where the reference shared key is a base key of the UE in the home network, a shared key derived based on a base key of the UE in the home network, a base key of the UE in the visited network, or a shared key derived based on a base key of the UE in the visited network; the base key of the UE in the home network is a key generated by performing, by the UE, two-way authentication with a key management device in the home network, and the base key of the UE in the visited network is a key generated by performing, by the UE, two-way authentication with a key management device in the visited network; and the target shared key is used to protect secure end-to-end data transmission between the UE and the visited gateway.

By performing the foregoing operations, when the UE roams into the visited network, the target security policy is generated by using a network element in the home network or the visited network, and the target security policy covers security requirements of some network elements in the home network and security requirements of some network elements in the visited network; further, the reference shared key is processed with reference to the rule defined by the target security policy to generate the target shared key, and the reference shared key is a key that is generated by performing, by the UE, two-way authentication in the home network or the visited network or that is further derived; and finally, the UE and the visited gateway in the visited network use the target shared key as a shared key for protecting secure end-to-end data transmission between the UE and the visited gateway, so that the UE can still securely transmit the data after network roaming.

In another optional solution, the second security requirement set includes the security requirement of the visited gateway; and the obtaining, by the processor 601, the target security policy is specifically:

sending the first security requirement set and the second security requirement set to another device in the visited network, so that the another device in the visited network generates the target security policy based on the first security requirement set and the second security requirement set and sends the target security policy to the visited session management device, or the visited session management device generates the target security policy based on the first security requirement set and the second security requirement set; and the visited session management device pre-stores the security requirement of the visited gateway or the visited session management device obtains the security requirement of the visited gateway from the visited gateway.

In another optional solution, the second security requirement set includes the security requirement of the home gateway; and the obtaining, by the processor 601, the target security policy is specifically:

sending, by using the transceiver 603, a second policy request message to a home session management device, where the second policy request message includes the first security requirement set, and the home session management device is a session management device in the home network of the UE; and receiving, by using the transceiver 603, the target security policy sent by the home session management device, where the target security policy is generated, based on the first security requirement set and the second security requirement set, by a device in the home network triggered by the home session management device after the home session management device receives the second policy request message, and the device in the home network stores the second security requirement set.

In another optional solution, when the reference shared key is a base key of the UE in the home network or a shared key derived based on a base key of the UE in the home network, after the processor 601 receives, by using the transceiver 603, the first session establishment request that includes the first security requirement set and that is sent by the user equipment UE, the processor 601 is further configured to:

send, by using the transceiver 603, a second session establishment request to the home session management device, so that the home session management device triggers the key management device in the home network to perform two-way authentication with the UE to generate the base key of the UE in the home network;

receive, by using the transceiver 603, the target shared key sent by the home session management device, where the target shared key is generated by the home session management device based on the target security policy and the reference shared key, and the reference shared key is sent by the key management device in the home network; and send, by using the transceiver 603, the target shared key to the visited gateway.

In another optional solution, when the reference shared key is a base key of the UE in the visited network or a shared key derived based on a base key of the UE in the visited network, the processor 601 is further configured to:

trigger the key management device in the visited network to perform two-way authentication with the UE to generate the base key of the UE in the visited network, where the key management device pre-obtains subscription information, to be used for two-way authentication, of the UE from a network element in the home network;

receive, by using the transceiver 603, the reference shared key sent by the key management device in the visited network, and send the reference shared key to the home session management device; and receive, by using the transceiver 603, the target shared key sent by the home session management device, and send the target shared key to the visited gateway, where the target shared key is generated by the home session management device based on the target security policy and the reference shared key.

In another optional solution, when the reference shared key is a base key of the UE in the home network or a shared key derived based on a base key of the UE in the home network, after the processor 601 receives, by using the transceiver 603, the first session establishment request that includes the first security requirement set and that is sent by the user equipment UE, the processor 601 is further configured to:

send, by using the transceiver 603, a second session establishment request to the home session management device, so that the home session management device triggers the key management device in the home network to perform two-way authentication with the UE to generate the base key of the UE in the home network;

receive, by using the transceiver 603, the reference shared key that is sent by the key management device in the home network and that is forwarded by the home session management device; and generate the target shared key based on the target security policy and the reference shared key, and send the target shared key to the visited gateway.

In another optional solution, when the reference shared key is a base key of the UE in the visited network or a shared key derived based on a base key of the UE in the visited network, the processor 601 is further configured to:

trigger the key management device in the visited network to perform two-way authentication with the UE to generate the base key of the UE in the visited network, where the key management device pre-obtains subscription information, to be used for two-way authentication, of the UE from a network element in the home network;

receive, by using the transceiver 603, the reference shared key sent by the key management device in the visited network; and generate the target shared key based on the target security policy and the reference shared key, and send the target shared key to the visited gateway.

In another optional solution, when the reference shared key is a base key of the UE in the home network or a shared key derived based on a base key of the UE in the home network, after the processor 601 receives, by using the transceiver 603, the first session establishment request that includes the first security requirement set and that is sent by the user equipment UE, the processor 601 is further configured to:

send, by using the transceiver 603, a second session establishment request to the home session management device, so that the home session management device triggers the key management device in the home network to perform two-way authentication with the UE to generate the base key of the UE in the home network; and the second session establishment request includes the target security policy;

receive, by using the transceiver 603, the target shared key sent by the home session management device, where the target shared key is generated by the home session management device based on the target security policy and the reference shared key, and the reference shared key is sent by the key management device in the home network; and send, by using the transceiver 603, the target shared key to the visited gateway.

In another optional solution, when the reference shared key is a base key of the UE in the visited network or a shared key derived based on a base key of the UE in the visited network, the processor 601 is further configured to:

trigger the key management device in the visited network to perform two-way authentication with the UE to generate the base key of the UE in the visited network, where the key management device pre-obtains subscription information, to be used for two-way authentication, of the UE from a network element in the home network;

receive, by using the transceiver 603, the reference shared key sent by the key management device in the visited network, and send the reference shared key and the target security policy to the home session management device; and receive, by using the transceiver 603, the target shared key sent by the home session management device, and send the target shared key to the visited gateway, where the target shared key is generated by the home session management device based on the target security policy and the reference shared key.

In another optional solution, the target security policy is obtained by processing the first security requirement set, a second security requirement, and a third security requirement set by using the preset rule, and the third security requirement set includes at least one of a security requirement of a server for providing the target service and a security requirement of a subscription server of the UE.

It should be noted that, specific implementation of the operations may further correspond to corresponding description of the method embodiment shown with reference to FIG. 2.

In the visited session management device 60 described in FIG. 6, when the UE roams into the visited network, the target security policy is generated by using a network element in the home network or the visited network, and the target security policy covers security requirements of some network elements in the home network and security requirements of some network elements in the visited network; further, the reference shared key is processed with reference to the rule defined by the target security policy to generate the target shared key, and the reference shared key is a key that is generated by performing, by the UE, two-way authentication in the home network or the visited network or that is further derived; and finally, the UE and the visited gateway in the visited network use the target shared key as a shared key for protecting secure end-to-end data transmission between the UE and the visited gateway, so that the UE can still securely transmit the data after network roaming.

Figure 7:
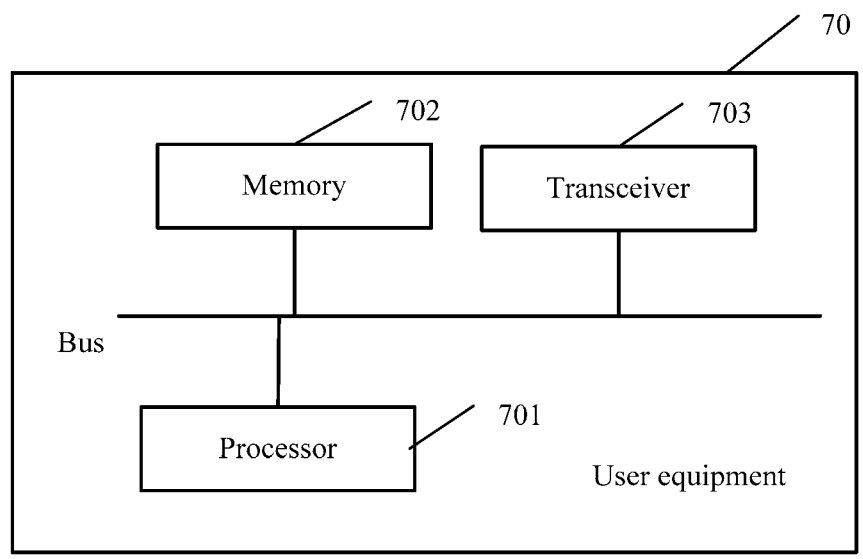
FIG. 7 is a schematic structural diagram of another user equipment according to an embodiment of the present invention.

FIG. 7 shows user equipment 70 according to an embodiment of the present invention. The user equipment 70 includes a processor 701, a memory 702, and a transceiver 703, and the processor 701, the memory 702, and the transceiver 703 are connected to each other by using a bus.

The memory 702 includes but is not limited to a random access memory (RAM), a read-only memory (ROM), an erasable programmable read-only memory (EPROM or flash memory), or a portable read-only memory (CD-ROM), and the memory 702 is used for a related instruction and data.

The transceiver 703 may include a receiver and a transmitter and is, for example, a wireless radio frequency module.

The processor 701 may be one or more central processing units (English: Central Processing Unit, CPU for short). When the processor 701 is one CPU, the CPU may be a single-core CPU or may be a multi-core CPU.

The processor 701 in the user equipment 70 is configured to read program code stored in the memory 702, to perform the following operations:

sending, by using the transceiver 703, a first session establishment request including a first security requirement set to a visited session management device, where the first security requirement set includes a security requirement of the UE and a security requirement of a target service, the security requirement defines at least one of an acceptable key algorithm, an acceptable key length, and an acceptable key update period, the target service is a service that is currently performed by the UE, and the visited session management device is a session management device in a visited network of the UE;

receiving, by using the transceiver 703, a target security policy sent by the visited session management device, where the target security policy is obtained by processing the first security requirement set and a second security requirement set by using a preset rule, the second security requirement set includes at least one of a security requirement of a visited gateway and a security requirement of a home gateway, the visited gateway is a user plane gateway used when the UE accesses the visited network, and the home gateway is a user plane gateway used when the UE accesses a home network of the UE;

generating a target shared key based on a reference shared key and according to a rule defined by the target security policy, where the reference shared key is a base key of the UE in the home network, a shared key derived based on a base key of the UE in the home network, a base key of the UE in the visited network, or a shared key derived based on a base key of the UE in the visited network; and the base key of the UE in the home network is a key generated by performing, by the UE, two-way authentication with a key management device in the home network, and the base key of the UE in the visited network is a key generated by performing, by the UE, two-way authentication with a key management device in the visited network; and protecting secure data transmission between the UE and the visited gateway by using the target shared key.

In an optional solution, the reference shared key is a base key of the UE in the home network or a shared key derived based on a base key of the UE in the home network; and before the processor 701 generates the target shared key based on the reference shared key and based on the rule defined by the target security policy, the processor 701 is further configured to:

perform two-way authentication with the key management device in the home network to generate the base key of the UE in the home network.

In another optional solution, the reference shared key is a base key of the UE in the visited network or a shared key derived based on a base key of the UE in the visited network; and before the processor 701 generates the target shared key based on the reference shared key and based on the rule defined by the target security policy, the processor 701 is further configured to:

perform two-way authentication with the key management device in the visited network to generate the base key of the UE in the visited network, where the key management device pre-obtains subscription information, to be used for two-way authentication, of the UE from a network element in the home network.

It should be noted that, specific implementation of the operations may further correspond to corresponding description of the method embodiment shown with reference to FIG. 2.

In the user equipment 70 described in FIG. 7, when the UE roams into the visited network, the target security policy is generated by using a network element in the home network or the visited network, and the target security policy covers security requirements of some network elements in the home network and security requirements of some network elements in the visited network; further, the reference shared key is processed with reference to the rule defined by the target security policy to generate the target shared key, and the reference shared key is a key that is generated by performing, by the UE, two-way authentication in the home network or the visited network or that is further derived; and finally, the UE and the visited gateway in the visited network use the target shared key as a shared key for protecting secure end-to-end data transmission between the UE and the visited gateway, so that the UE can still securely transmit the data after network roaming.

Methods and apparatuses according to the embodiments of the present invention are described in detail above. For convenience of better implementing the foregoing solutions according to the embodiments of the present invention, correspondingly, a related system according to the embodiments of the present invention is provided below.

Figure 8:
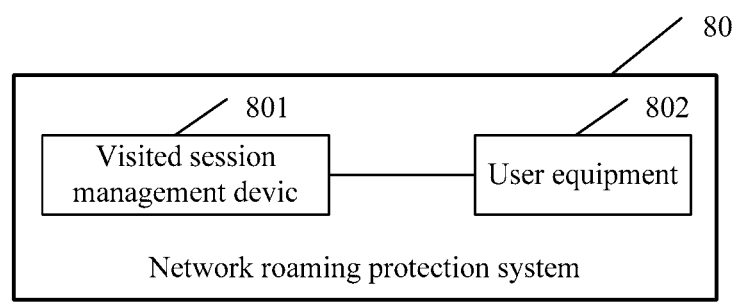
FIG. 8 is a schematic structural diagram of a network roaming protection system according to an embodiment of the present invention.

FIG. 8 is a schematic structural diagram of a network roaming protection system 80 according to an embodiment of the present invention. The system 80 includes a visited session management device 801 and user equipment 802, where the visited session management device 801 may be the visited session management device 40 shown in FIG. 4 or the visited session management device 60 shown in FIG. 6; and the user equipment 802 may be the user equipment 50 shown in FIG. 5 or the user equipment 70 shown in FIG. 7.

In the system 80 described in FIG. 8, when the UE roams into the visited network, the target security policy is generated by using a network element in the home network or the visited network, and the target security policy covers security requirements of some network elements in the home network and security requirements of some network elements in the visited network; further, the reference shared key is processed with reference to the rule defined by the target security policy to generate the target shared key, and the reference shared key is a key that is generated by performing, by the UE, two-way authentication in the home network or the visited network or that is further derived; and finally, the UE and the visited gateway in the visited network use the target shared key as a shared key for protecting secure end-to-end data transmission between the UE and the visited gateway, so that the UE can still securely transmit the data after network roaming.

To sum up, by implementing the embodiments of the present invention, when the UE roams into the visited network, the target security policy is generated by using a network element in the home network or the visited network, and the target security policy covers security requirements of some network elements in the home network and security requirements of some network elements in the visited network; further, the reference shared key is processed with reference to the rule defined by the target security policy to generate the target shared key, and the reference shared key is a key that is generated by performing, by the UE, two-way authentication in the home network or the visited network or that is further derived; and finally, the UE and the visited gateway in the visited network use the target shared key as a shared key for protecting secure end-to-end data transmission between the UE and the visited gateway, so that the UE can still securely transmit the data after network roaming.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM, a RAM, a magnetic disk, or an optical disc.

What is claimed is:

1. A network roaming protection method, comprising:
    receiving, by a visited session management device, a first session establishment request that comprises a first security requirement set and that is sent by user equipment (UE), wherein the first security requirement set comprises a security requirement of the UE and a security requirement of a target service, the security requirement defines at least one of an acceptable key algorithm, an acceptable key length, and an acceptable key update period, the target service is a service that is currently performed by the UE, and the visited session management device is a session management device in a visited network of the UE;
    obtaining, by the visited session management device, a target security policy, wherein the target security policy is obtained by processing the first security requirement set and a second security requirement set using a preset rule, the second security requirement set comprises at least one of a security requirement of a visited gateway and a security requirement of a home gateway, the visited gateway is a user plane gateway used when the UE accesses the visited network, and the home gateway is a user plane gateway used when the UE accesses a home network of the UE; and
    sending, by the visited session management device, the target security policy to the UE instructing the UE to generate a target shared key based on a reference shared key and according to a rule defined by the target security policy, wherein the reference shared key is a base key of the UE in the home network, a shared key derived based on a base key of the UE in the home network, a base key of the UE in the visited network, or a shared key derived based on a base key of the UE in the visited network; the base key of the UE in the home network is a key generated by performing two-way authentication with a key management device in the home network, and the base key of the UE in the visited network is a key generated by performing two-way authentication with a key management device in the visited network; and the target shared key is used to protect secure end-to-end data transmission between the UE and the visited gateway.

2. The method according to claim 1, wherein the second security requirement set comprises the security requirement of the visited gateway; and the obtaining, by the visited session management device, a target security policy comprises:
    sending, by the visited session management device, the first security requirement set and the second security requirement set to another device in the visited network instructing the another device in the visited network to generate the target security policy based on the first security requirement set and the second security requirement set and sends the target security policy to the visited session management device, or the visited session management device generates the target security policy based on the first security requirement set and the second security requirement set; and the visited session management device pre-stores the security requirement of the visited gateway or the visited session management device obtains the security requirement of the visited gateway from the visited gateway.

3. The method according to claim 1, wherein the second security requirement set comprises the security requirement of the home gateway; and the obtaining, by the visited session management device, a target security policy comprises:
    sending, by the visited session management device, a second policy request message to a home session management device, wherein the second policy request message comprises the first security requirement set, and the home session management device is a session management device in the home network of the UE; and
    receiving, by the visited session management device, the target security policy sent by the home session management device, wherein the target security policy is generated, based on the first security requirement set and the second security requirement set, by a device in the home network triggered by the home session management device after the home session management device receives the second policy request message, and the device in the home network stores the second security requirement set.

4. The method according to claim 3, wherein if the reference shared key is a base key of the UE in the home network or a shared key derived based on a base key of the UE in the home network, after the receiving, by a visited session management device, a first session establishment request that comprises a first security requirement set and that is sent by user equipment UE, the method further comprises:
- sending, by the visited session management device, a second session establishment request to the home session management device instructing the home session management device to trigger the key management device in the home network to perform two-way authentication with the UE to generate the base key of the UE in the home network;
- receiving, by the visited session management device, the target shared key sent by the home session management device, wherein the target shared key is generated by the home session management device based on the target security policy and the reference shared key, and the reference shared key is sent by the key management device in the home network; and
- sending, by the visited session management device, the target shared key to the visited gateway.

5. The method according to claim 3, wherein if the reference shared key is a base key of the UE in the visited network or a shared key derived based on a base key of the UE in the visited network, the method further comprises:
- triggering, by the visited session management device, the key management device in the visited network to perform two-way authentication with the UE to generate the base key of the UE in the visited network, wherein the key management device pre-obtains subscription information, to be used for two-way authentication, of the UE from a network element in the home network;
- receiving, by the visited session management device, the reference shared key sent by the key management device in the visited network, and sending the reference shared key to the home session management device; and
- receiving, by the visited session management device, the target shared key sent by the home session management device, and sending the target shared key to the visited gateway, wherein the target shared key is generated by the home session management device based on the target security policy and the reference shared key.

6. The method according to claim 2, wherein if the reference shared key is a base key of the UE in the home network or a shared key derived based on a base key of the UE in the home network, after the receiving, by a visited session management device, a first session establishment request that comprises a first security requirement set and that is sent by user equipment UE, the method further comprises:
- sending, by the visited session management device, a second session establishment request to the home session management device instructing the home session management device to trigger the key management device in the home network to perform two-way authentication with the UE to generate the base key of the UE in the home network;
- receiving, by the visited session management device, the reference shared key that is sent by the key management device in the home network and that is forwarded by the home session management device; and
- generating, by the visited session management device, the target shared key based on the target security policy and the reference shared key, and sending the target shared key to the visited gateway.

7. The method according to claim 2, wherein if the reference shared key is a base key of the UE in the visited network or a shared key derived based on a base key of the UE in the visited network, the method further comprises:
- triggering, by the visited session management device, the key management device in the visited network to perform two-way authentication with the UE to generate the base key of the UE in the visited network, wherein the key management device pre-obtains subscription information, to be used for two-way authentication, of the UE from a network element in the home network;
- receiving, by the visited session management device, the reference shared key sent by the key management device in the visited network; and
- generating, by the visited session management device, the target shared key based on the target security policy and the reference shared key, and sending the target shared key to the visited gateway.

8. A network roaming protection method, comprising:
- sending, by user equipment (UE), a first session establishment request comprising a first security requirement set to a visited session management device, wherein the first security requirement set comprises a security requirement of the UE and a security requirement of a target service, the security requirement defines at least one of an acceptable key algorithm, an acceptable key length, and an acceptable key update period, the target service is a service that is currently performed by the UE, and the visited session management device is a session management device in a visited network of the UE;
- receiving, by the UE, a target security policy sent by the visited session management device, wherein the target security policy is obtained by processing the first security requirement set and a second security requirement set using a preset rule, the second security requirement set comprises at least one of a security requirement of a visited gateway and a security requirement of a home gateway, the visited gateway is a user plane gateway used when the UE accesses the visited network, and the home gateway is a user plane gateway used when the UE accesses a home network of the UE;
- generating, by the UE, a target shared key based on a reference shared key and according to a rule defined by the target security policy, wherein the reference shared key is a base key of the UE in the home network, a shared key derived based on a base key of the UE in the home network, a base key of the UE in the visited network, or a shared key derived based on a base key of the UE in the visited network; and the base key of the UE in the home network is a key generated by performing, by the UE, two-way authentication with a key management device in the home network, and the base key of the UE in the visited network is a key generated by performing, by the UE, two-way authentication with a key management device in the visited network; and
- protecting, by the UE, secure data transmission between the UE and the visited gateway using the target shared key.

9. The method according to claim 8, wherein the reference shared key is a base key of the UE in the home network or a shared key derived based on a base key of the UE in the home network; and before the generating, by the UE, a target shared key based on a reference shared key and according to a rule defined by the target security policy, the method further comprises:

performing, by the UE, two-way authentication with the key management device in the home network to generate the base key of the UE in the home network.

10. The method according to claim 8, wherein the reference shared key is a base key of the UE in the visited network or a shared key derived based on a base key of the UE in the visited network; and before the generating, by the UE, a target shared key based on a reference shared key and according to a rule defined by the target security policy, the method further comprises:

performing, by the UE, two-way authentication with the key management device in the visited network to generate the base key of the UE in the visited network, wherein the key management device pre-obtains subscription information, to be used for two-way authentication, of the UE from a network element in the home network.

11. A visited session management device, comprising:

a first receiver configured to receive a first session establishment request that comprises a first security requirement set and that is sent by user equipment UE, wherein the first security requirement set comprises a security requirement of the UE and a security requirement of a target service, the security requirement defines at least one of an acceptable key algorithm, an acceptable key length, and an acceptable key update period, the target service is a service that is currently performed by the UE, and the visited session management device is a session management device in a visited network of the UE;

at least one processor;

a non-transitory computer-readable storage medium coupled to the at least one processor and storing programming instructions for execution by the at least one processor, wherein the programming instructions instruct the at least one processor to obtain a target security policy, wherein the target security policy is obtained by processing the first security requirement set and a second security requirement set using a preset rule, the second security requirement set comprises at least one of a security requirement of a visited gateway and a security requirement of a home gateway, the visited gateway is a user plane gateway used when the UE accesses the visited network, and the home gateway is a user plane gateway used when the UE accesses a home network of the UE; and a transmitter configured to send the target security policy to the UE instructing the UE to generate a target shared key based on a reference shared key and according to a rule defined by the target security policy, wherein the reference shared key is a base key of the UE in the home network, a shared key derived based on a base key of the UE in the home network, a base key of the UE in the visited network, or a shared key derived based on a base key of the UE in the visited network; the base key of the UE in the home network is a key generated by performing two-way authentication with a key management device in the home network, and the base key of the UE in the visited network is a key generated by performing two-way authentication with a key management device in the visited network; and the target shared key is used to protect secure end-to-end data transmission between the UE and the visited gateway.

12. The visited session management device according to claim 11, wherein the second security requirement set comprises the security requirement of the visited gateway; and the programming instructions instruct the at least one processor to send the first security requirement set and the second security requirement set to another device in the visited network instructing the another device in the visited network to generate the target security policy based on the first security requirement set and the second security requirement set and sends the target security policy to the visited session management device, or the visited session management device generates the target security policy based on the first security requirement set and the second security requirement set; and the visited session management device pre-stores the security requirement of the visited gateway or the visited session management device obtains the security requirement of the visited gateway from the visited gateway.

13. The visited session management device according to claim 11, wherein the second security requirement set comprises the security requirement of the home gateway; and the programming instructions instruct the at least one processor to:

send a second policy request message to a home session management device, wherein the second policy request message comprises the first security requirement set, and the home session management device is a session management device in the home network of the UE; and receive the target security policy sent by the home session management device, wherein the target security policy is generated, based on the first security requirement set and the second security requirement set, by a device in the home network triggered by the home session management device after the home session management device receives the second policy request message, and the device in the home network stores the second security requirement set.

14. The visited session management device according to claim 13, wherein if the reference shared key is a base key of the UE in the home network or a shared key derived based on a base key of the UE in the home network, the visited session management device comprises:

a second transmitter is configured to: after the first receiver receives the first session establishment request that comprises the first security requirement set and that is sent by the user equipment UE, send a second session establishment request to the home session management device instructing the home session management device to trigger the key management device in the home network to perform two-way authentication with the UE to generate the base key of the UE in the home network;

a second receiver, configured to receive the target shared key sent by the home session management device, wherein the target shared key is generated by the home session management device based on the target security policy and the reference shared key, and the reference shared key is sent by the key management device in the home network; and a third transmitter, configured to send the target shared key to the visited gateway.

15. The visited session management device according to claim 13, wherein if the reference shared key is a base key of the UE in the visited network or a shared key derived based on a base key of the UE in the visited network, the programming instructions instruct the at least one processor to trigger the key management device in the visited network to perform two-way authentication with the UE to generate the base key of the UE in the visited network, wherein the key management device pre-obtains subscription information, to be used for two-way authentication, of the UE from a network element in the home network; and the visited session management device comprises:
a third receiver, configured to receive the reference shared key sent by the key management device in the visited network, and send the reference shared key to the home session management device; and
a fourth receiver, configured to receive the target shared key sent by the home session management device, and send the target shared key to the visited gateway, wherein the target shared key is generated by the home session management device based on the target security policy and the reference shared key.

16. The visited session management device according to claim 12, wherein if the reference shared key is a base key of the UE in the home network or a shared key derived based on a base key of the UE in the home network, the visited session management device further comprises:
a fourth transmitter, configured to: after the first receiver receives the first session establishment request that comprises the first security requirement set and that is sent by the user equipment UE, send a second session establishment request to the home session management device instructing the home session management device to trigger the key management device in the home network to perform two-way authentication with the UE to generate the base key of the UE in the home network;
a fifth receiver, configured to receive the reference shared key that is sent by the key management device in the home network and that is forwarded by the home session management device; and
a first generator, configured to generate the target shared key based on the target security policy and the reference shared key, and send the target shared key to the visited gateway.

17. The visited session management device according to claim 12, wherein if the reference shared key is a base key of the UE in the visited network or a shared key derived based on a base key of the UE in the visited network, the programming instructions instruct the at least one processor to trigger the key management device in the visited network to perform two-way authentication with the UE to generate the base key of the UE in the visited network, wherein the key management device pre-obtains subscription information, to be used for two-way authentication, of the UE from a network element in the home network;
the visited session management device comprises:
a sixth receiver, configured to receive the reference shared key sent by the key management device in the visited network; and
a second generator, configured to generate the target shared key based on the target security policy and the reference shared key, and send the target shared key to the visited gateway.

18. User equipment, comprising:
a transmitter, configured to send a first session establishment request comprising a first security requirement set to a visited session management device, wherein the first security requirement set comprises a security requirement of the UE and a security requirement of a target service, the security requirement defines at least one of an acceptable key algorithm, an acceptable key length, and an acceptable key update period, the target service is a service that is currently performed by the UE, and the visited session management device is a session management device in a visited network of the UE;
a receiver, configured to receive a target security policy sent by the visited session management device, wherein the target security policy is obtained by processing the first security requirement set and a second security requirement set using a preset rule, the second security requirement set comprises at least one of a security requirement of a visited gateway and a security requirement of a home gateway, the visited gateway is a user plane gateway used when the UE accesses the visited network, and the home gateway is a user plane gateway used when the UE accesses a home network of the UE;
at least one processor; and
a non-transitory computer-readable storage medium coupled to the at least one processor and storing programming instructions for execution by the at least one processor, wherein the programming instructions instruct the at least one processor to:
generate a target shared key based on a reference shared key and according to a rule defined by the target security policy, wherein the reference shared key is a base key of the UE in the home network, a shared key derived based on a base key of the UE in the home network, a base key of the UE in the visited network, or a shared key derived based on a base key of the UE in the visited network; and the base key of the UE in the home network is a key generated by performing, by the UE, two-way authentication with a key management device in the home network, and the base key of the UE in the visited network is a key generated by performing, by the UE, two-way authentication with a key management device in the visited network; and
protect secure data transmission between the UE and the visited gateway using the target shared key.

19. The user equipment according to claim 18, wherein the reference shared key is a base key of the UE in the home network or a shared key derived based on a base key of the UE in the home network, and the programming instructions instruct the at least one processor to: before generating the target shared key based on the reference shared key and based on the rule defined by the target security policy, perform two-way authentication with the key management device in the home network to generate the base key of the UE in the home network.

20. The user equipment according to claim 18, wherein the reference shared key is a base key of the UE in the visited network or a shared key derived based on a base key of the UE in the visited network; and the programming instructions instruct the at least one processor to: before generating the target shared key based on the reference shared key and based on the rule defined by the target security policy, perform two-way authentication with the key management device in the visited network to generate the base key of the UE in the visited network, wherein the key management device pre-obtains subscription information, to be used for two-way authentication, of the UE from a network element in the home network.

* * * * *